US011836850B2

(12) United States Patent
Tagra et al.

(10) Patent No.: US 11,836,850 B2
(45) Date of Patent: *Dec. 5, 2023

(54) VISUALLY AUGMENTING IMAGES OF THREE-DIMENSIONAL CONTAINERS WITH VIRTUAL ELEMENTS

(71) Applicant: Adobe Inc., San Jose, CA (US)

(72) Inventors: Sanjeev Tagra, Haryana (IN); Sachin Soni, New Delhi (IN); Ajay Jain, Ghaziabad (IN); Ryan Rozich, Austin, TX (US); Jonathan Roeder, Round Rock, TX (US); Prasenjit Mondal, West Bengal (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,109

(22) Filed: Jun. 1, 2021

(65) Prior Publication Data
US 2021/0287425 A1   Sep. 16, 2021

Related U.S. Application Data

(63) Continuation of application No. 16/535,780, filed on Aug. 8, 2019, now Pat. No. 11,055,905.

(51) Int. Cl.
*G06T 19/20* (2011.01)
*G06T 15/50* (2011.01)
(Continued)

(52) U.S. Cl.
CPC .............. *G06T 15/50* (2013.01); *G06T 7/40* (2013.01); *G06T 7/50* (2017.01); *G06T 19/20* (2013.01)

(58) Field of Classification Search
None
See application file for complete search history.

(56) References Cited

U.S. PATENT DOCUMENTS

2013/0147862 A1* 6/2013 Atkins ............... G09G 5/008
                                                   345/690
2013/0218799 A1* 8/2013 Lehmann ......... G06Q 10/083
                                                   705/337
(Continued)

OTHER PUBLICATIONS

"Adobe to Acquire Magento Commerce", Adobe Newsroom, Available online at: https://news.adobe.com/pressrelease/corporate/adobe-acquire-magento-commerce, May 21, 2018, 4 pages.
(Continued)

*Primary Examiner* — Steven Z Elbinger
(74) *Attorney, Agent, or Firm* — Kilpatrick Townsend & Stockton LLP

(57) ABSTRACT

Certain embodiments involve visually augmenting images of three-dimensional containers with virtual elements that fill one or more empty regions of the three-dimensional containers. For instance, a computing system receives a first image that depicts a storage container and identify sub-containers within the storage container. The computing system selects, from a virtual object library, a plurality of virtual objects that are semantically related to the sub-container. The computing system determines an arrangement of the virtual objects within the sub-container based on semantics associated with the sub-container and the plurality of virtual objects. The computing system generates a second image that depicts the arrangement of the plurality of virtual objects within the storage container and sub-containers. The computing system generates, for display, the second image depicting the storage container and the arrangement of the virtual objects.

20 Claims, 20 Drawing Sheets

(51) Int. Cl.
  *G06T 7/50* (2017.01)
  *G06T 7/40* (2017.01)

(56) References Cited

U.S. PATENT DOCUMENTS

| | | | |
|---|---|---|---|
| 2013/0226649 A1 | 8/2013 | Grissom | |
| 2015/0178953 A1 | 6/2015 | Gao et al. | |
| 2016/0033770 A1* | 2/2016 | Fujimaki | H04N 13/344 345/8 |
| 2016/0042252 A1* | 2/2016 | Sawhney | G06F 16/5838 382/190 |
| 2016/0210722 A1* | 7/2016 | Fortin | A63F 13/30 |
| 2016/0330522 A1 | 11/2016 | Newell et al. | |
| 2017/0169135 A1 | 6/2017 | Kumar et al. | |
| 2018/0150791 A1* | 5/2018 | Stansell | G06T 19/006 |
| 2020/0202389 A1 | 6/2020 | Pulido et al. | |
| 2021/0149544 A1* | 5/2021 | Matsushima | G06F 3/01 |

OTHER PUBLICATIONS

"Basic Lighting", LearnOpenGL, Available online at: https://learnopengl.com/Lighting/Basic-Lighting, Accessed from Internet on Aug. 6, 2019, 9 pages.
"Connected-Component Labeling", Wikipedia, Available online at: https://en.wikipedia.org/wiki/Connectedcomponent_labeling, Jul. 30, 2019, 10 pages.
"OpenCV Wiki", Github, Available online at: https://github.com/opencv/opencv/wiki, Accessed from Internet on Aug. 6, 2019, 4 pages.
U.S. Appl. No. 16/535,780 , Non-Final Office Action, dated Sep. 11, 2020, 22 pages.
U.S. Appl. No. 16/535,780 , Notice of Allowance, dated Mar. 2, 2021, 10 pages.
Bao et al., "Generating and Exploring Good Building Layouts", Journal ACM Transactions on Graphics, vol. 32, No. 4, Available online at: http:f/peterwonka.net/Publications/pdfsi2013.SG.Bao.SmartLayout.pdf, Jul. 2013, 11 pages.
Choi et al., "Indoor Scene Understanding with Geometric and Semantic Contexts", International Journal of Computer Vision, vol. 112, No. 2, Apr. 2015, pp. 204-220.
Haralick et al., "Textural Features for Image Classification", IEEE Transactions on Systems, Man and Cybernetics, vol. SMC-3, No. 6, Nov. 1973, pp. 610-621.
Hedau et al., "Recovering the Spatial Layout of Cluttered Rooms", IEEE Explore 12 International Conference on computer Vision, 2009, 8 pages.
Jiang et al., "Learning Object Arrangements in 3D Scenes using Human Context", In Proceedings International Conference on Machine Learning, 2012, 8 pages.
Jiang et al., "Learning to Place New Objects", The International Journal of Robotics Research, May 2012, 8 pages.
Jiang et al., "Modeling 3D Environments through Hidden Human Context", IEEE Transactions on Pattern Analysis and Machine Intelligence, vol. 38, No. 10, Dec. 2015, pp. 1-14.
Kremier , "Product Photography: How Impacts your e-Commerce Conversion", Objeqt, Available online at: https://www.objeqt.com/blog/product-photographyecommerce-conversion/, Jun. 1, 2017, 9 pages.
Lee et al., "Estimating Spatial Layout of Rooms using Volumetric Reasoning about Objects and Surfaces", Advances in Neural Information Processing Systems 23, vol. 1, 24th Annual Conference on Neural Information Processing Systems, Jan. 2010, pp. 1-9.
Merrell et al., "Interactive Furniture Layout Using Interior Design Guidelines", ACM Transactions Graphics, vol. 30, No. 4, Article 87, Jul. 2011, 9 pages.
Weiss et al., "Automated Layout Synthesis and Visualization from Images of Interior or Exterior Spaces", Computer Vision and Pattern Recognition Workshops(CVPRW), IEEE Computer Society Conference, Jul. 2017, pp. 41-47.
Yu et al., "Make it Home: Automatic Optimization of Furniture Arrangement", ACM Transactions on Graphics, vol. 30, No. 4, Article 86, Jul. 2011, 11 pages.

* cited by examiner

Number of Edges: 12
Number of Faces: 6
Number of Vertices: 8

Number of Edges: 24
Number of Faces: 10
Number of Vertices: 16

Number of Edges: 12
Number of Faces: 7
Number of Vertices: 7

VISUALLY AUGMENTING IMAGES OF THREE-DIMENSIONAL CONTAINERS WITH VIRTUAL ELEMENTS

CROSS-REFERENCE TO RELATED APPLICATIONS

This application is a continuation of U.S. patent application Ser. No. 16/535,780, filed on Aug. 8, 2019, now allowed, the contents of all of which are incorporated herein by reference.

TECHNICAL FIELD

This disclosure generally relates to image processing. More specifically, but not by way of limitation, this disclosure relates to visually augmenting images of three-dimensional containers with virtual elements that fill empty portions of the three-dimensional containers.

BACKGROUND

Image processing systems are used for creating appealing images that are displayed with online services that provide digital forums in which end users may interact with online content (e.g., by purchasing products or services, commenting on products or services, etc.). Image processing systems use modeling algorithms that involve techniques such as digital filtering, pattern recognition, pixelation interpolation, texture filtering, etc. These image processing algorithms enhance digital photographs or other images, which can be generated by cameras and can depict real objects.

Existing techniques for enhance photographs of products or services, however, may present disadvantages. For example, in the context of an online service, providers frequently receive images depicting physical items (e.g., storage cabinets) that may be unfinished, unclear, or empty. Current image enhancement techniques may be able to present these images of physical items in a more visually appealing manner (e.g., via enhancing the colors or lighting in an image, generating rotatable three-dimensional versions of the image, etc.). But since these photographs depict physical items that are unfinished, unclear, or empty items, even the enhanced photographs may not accurately depict the appearance of these physical items when they are used as intended (e.g., when storage cabinets are filled with items). Thus, existing solutions may provide incomplete depictions of a physical item under consideration to an end user.

SUMMARY

Certain embodiments involve visually augmenting images of three-dimensional containers with virtual elements that fill one or more empty regions of the three-dimensional containers. For instance, a computing system receives a first image that depicts a storage container and identifies sub-containers within the storage container. In an illustrative example, the first image could depict an empty refrigerator with various shelves and drawers. The computing system selects, from a virtual object library, virtual objects that are semantically related to each sub-container. Continuing with the "refrigerator" example, the virtual objects could be images of milk and other large food items, which have a size and shape that are semantically related to a shelf, and images of fruit, which have a size and shape that are semantically related to a drawer. The computing system determines an arrangement of the virtual objects within each sub-container based on semantics associated with the respective sub-container and the virtual objects. The computing system generates a second image that depicts the arrangement of the virtual objects within the storage container and sub-containers. In the example above, the computing system generates an image of the refrigerator filled with the food objects, where the food objects are positioned in semantically related sub-containers (e.g., milk on a shelf, fruit in a drawer, etc.). The computing system outputs the second image depicting the storage container and the arrangement of the virtual objects.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
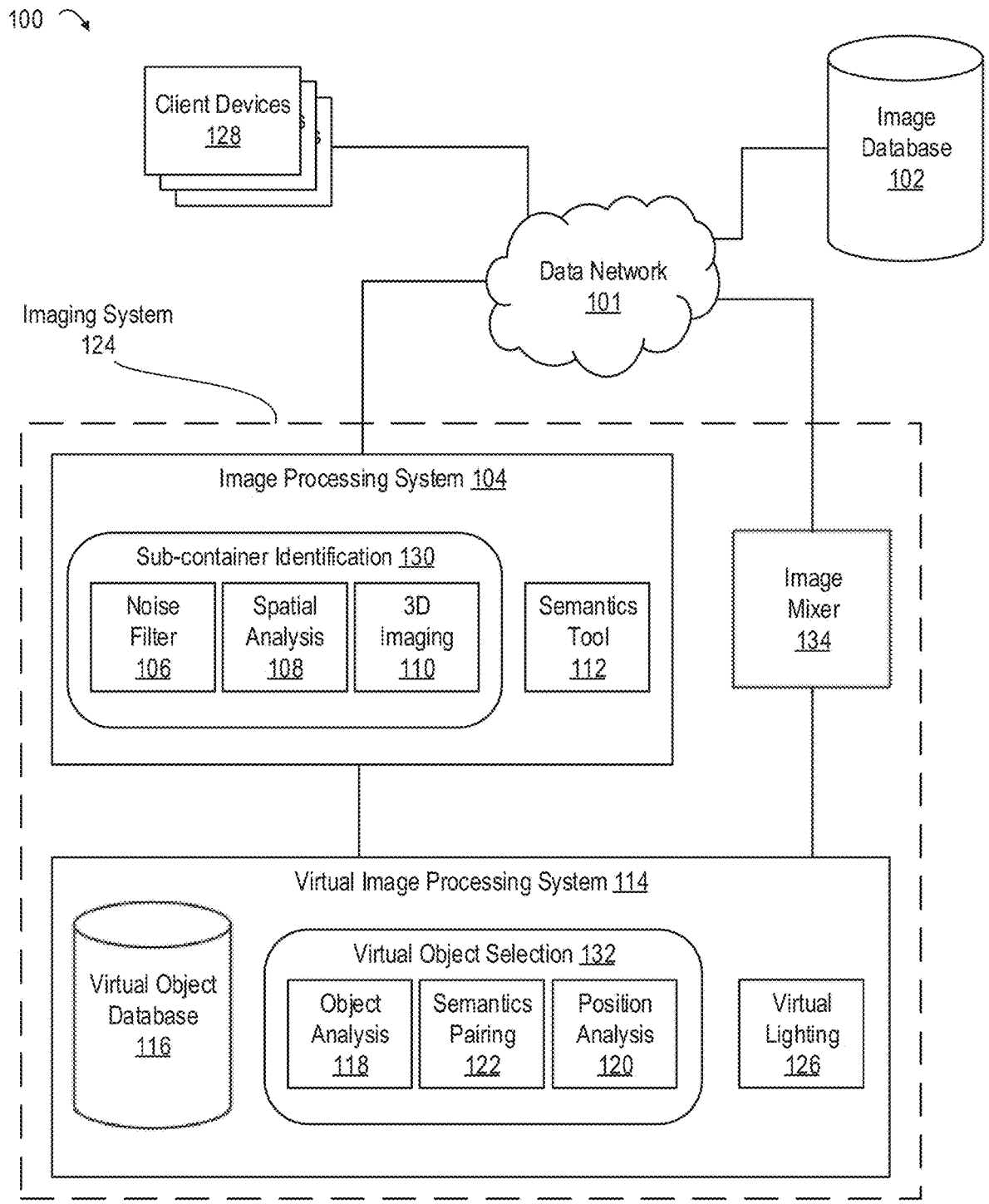
FIG. 1 depicts an example of a computing environment for visually augmenting images of three-dimensional containers having one or more empty regions with virtual elements, according to certain embodiments of the present disclosure.

The present disclosure includes visually augmenting images of three-dimensional containers by inserting virtual elements into one or more empty regions of the three-dimensional containers.

The following non-limiting example is provided to introduce certain embodiments. In this example, an automated image processing system receives a first image that depicts a storage container. For instance, the automated image processing system receives an input image that is uploaded via an end-user device. The input image depicts a storage container, which could be any object having a structure that is used to store at least one item. Examples of storage containers depicted in the first image include a cabinet, a refrigerator, a desk drawer, a closet, etc. The automated image processing system identifies sub-containers within the storage container. For instance, if the first image is a refrigerator, the automated image processing system detects edges and vertices within the first image and determines, from the detected edges and vertices, which regions of the first image depict sub-containers of the refrigerator (e.g., drawers, shelves, etc.).

Continuing with this example, the virtual image processing system selects, from a virtual object library (e.g., a library in a Graphics Library Framework ("GLFW")), virtual objects that are semantically related to each sub-container. For instance, the refrigerator mentioned above may have a number of sub-containers, and each sub-container can have numerous semantics associated with it. In one example, a refrigerator may have portions that are designated storage areas for beverages, e.g., a water dispenser or soft drink cooler. The same refrigerator can also have different storage areas designed to hold dairy products, e.g., a cheese or butter tray. Further, the refrigerator can have any number of cold cut trays, fruit drawers, vegetable containers, beverage racks, etc. Each of these storage areas are sub-containers within the container, e.g., the refrigerator. And for each sub-container mentioned above, there are several semantics that may identify it. For instance, a sub-container of a fruit drawer may have a solid, translucent, or semi-transparent appearance, a specific height, weight, or depth, various labels, a location in several positions within the refrigerator, or any combination of these. These identifying elements of the fruit drawer are all semantics that can enable the virtual image processing system to form a semantic relationship between the fruit drawer and one or more virtual objects.

The virtual image processing system determines an arrangement of the virtual objects within each sub-container based on semantics associated with the respective sub-container and the virtual objects. These semantics could be determined from one or more identifiable attributes related to or representative of a logical object, which enable conceptual, implicit or explicit, relationships to be formed based on references to the one or more identifiable attributes. For instance, continuing with the refrigerator example above, the semantics for each sub-container can be employed to form relationships with various virtual objects, e.g., one or more virtual milk containers, water bottles, poultry items, grapes, apples, etc. In one example, a semi-transparent drawer that is labeled "fruit" can be logically interpolated to form a relationship with one or more virtual fruits, e.g., virtual apples, grapes, cantaloupes, honey dew melons, strawberries, etc. The virtual image processing system generates a second image that depicts the arrangement of the virtual objects within the storage container and sub-containers. In an illustrative example, the image processing system transforms the first image, which depicts an empty refrigerator, into the second image, which depicts the same refrigerator with various foods or drinks positioned on shelves or in drawers. The image processing system outputs the second image depicting the storage container and the arrangement of the virtual objects.

Certain embodiments provide improvements to computing systems used for editing image content by automatically applying various rules of a particular type. For instance, existing image editing techniques involving images of containers often entail cumbersome or time-consuming processes, such as manually filling a physical container with different sets of objects and capturing images of the container with these different sets of object. These problems can be addressed by features described herein. For instance, an imaging system discussed herein could obviate the need for these manual processes using embodiments described herein that detect and identify sub-containers in an image, embodiments that select semantically appropriate virtual elements for positioning within the depicted sub-containers, embodiments that generate semantically appropriate arrangements of virtual elements within the depicted sub-containers, or some combination thereof. These embodiments allow different versions of a "filled" storage container to be generated automatically, without relying (in whole or in part) on a human being to painstakingly capture different images of the real-world container filled with real-word arrangements of objects. Further, the embodiments discussed herein are enabled to send and retrieve images to remote network locations, enhancing user interactivity and image processing efficiencies by augmenting images off-site. Thus, embodiments described herein improve computer-implemented processes for generating artificial image content, thereby providing a more suitable solution for automating tasks previously performed by humans.

Example of a Computing Environment for Visually Augmenting Images of Storage Containers Referring now to the drawings, FIG. 1 depicts an example of a computing environment 100 for visually augmenting images of three-dimensional containers, which could include one or more empty regions, with virtual elements, according to certain embodiments of the present disclosure. In the example depicted in FIG. 1, various client devices 128 access an imaging system 124 via a data network 101. In some embodiments, as in the example of FIG. 1, the imaging system 124 includes an image processing system 104 and a virtual image processing system 114. In additional or alternative embodiments, an image processing system 104 and a virtual image processing system 114 could be implemented in separate, independently operated computing systems.

The imaging system 124 includes one or more devices that provide and execute one or more modules, engines, applications, etc. for providing one or more digital experiences to the user. The imaging system 124 can be implemented using one or more servers, one or more platforms with corresponding application programming interfaces, cloud infrastructure, and the like. In addition, each engine can also be implemented using one or more servers, one or more platforms with corresponding application programming interfaces, cloud infrastructure, and the like.

Visually augmenting real images of three-dimensional containers to virtual images can be used to simulate realistic virtual images of the three-dimensional containers filled with an arrangement of virtual elements. As an illustrative example, these virtual images can be used to enhance ordinary, plain photographs of consumer goods to appeal to end users. For instance, images of empty containers (e.g., refrigerators, storage furniture, kitchen cabinetry, office supply containers) can be augmented in an aesthetically pleasing manner by employing virtual elements to fill or light images of real, empty three-dimensional containers. In some examples, the virtual images used to fill the empty three-dimensional containers may be based on real-life images of a variety of objects.

Some embodiments of the computing environment 100 include client devices 128. For instance, the client devices 128 may be operated by client entities (e.g., manufacturers, commercial entities, content providers) requesting augmentation of existing images to be augmented with techniques discussed herein. Such requests can be performed by sending images directly to the imaging system 124 or by requesting retrieval of images from image database 102. In another example, the client devices 128 may be operated by end users that desire to view an image of an empty container filled with virtual elements. For instance, end users operating client devices may request retrieval of one or more real images or one or more previously augmented images from an image database 102, an image mixer 134, an image processing system 104, a virtual image processing system 114, or any combination of these.

Examples of a client device 128 include, but are not limited to, a personal computer, a tablet, a desktop, a server, a mobile device, a smartphone, a processing unit, any combination of these devices, or any other suitable device having one or more processors. A user of a client device 128 uses various products, applications, or services supported by the imaging system 124 via the data network 101.

Each of the client devices 128 are communicatively coupled to the imaging system 124 via the data network 101. Examples of the data network 101 include, but are not limited to, internet, local area network ("LAN"), wireless area network, wired area network, wide area network, and the like.

Examples of Operations for Image Processing

In some embodiments, the image processing system 104 is used to augment, at least in part, images of three-dimensional containers. As described in detail with respect to the various examples below, the image processing system 104 is used to obtain, detect, and identify features associated with one or more images. For instance, the image processing system 104 executes one or more sub-container identification modules 130 (or other suitable program code) for performing one or more functions used in identifying sub-containers within a storage container of a first image obtained from image database 102. The sub-container identification modules 130 communicates with semantics tool 112 to determine contextual information related to the each of the sub-containers identified within the storage container. Image processing system 104 sends the information associated with the identified sub-containers and their respective semantics to a virtual image processing system 114.

In an illustrative example, the image processing system 104 receives a first image, real or virtual, of an empty storage container. The image processing system 104 employs the noise filter module 106 to de-noise a gradient image of the one or more sub-containers. An example of a gradient image is an image depicting an object having a feature associated with one or more directional changes of a hue, or an intensity of a color contained within the image, where these directional changes can be employed to determine, for instance, one or more textures based on the image's associated pixel values. In some examples, the sub-container identification modules 130 can identify information related to sub-containers within a container of the first image. For instance, the spatial analysis module 108 may determine three-dimensional shapes and relative sizes of one or more sub-containers within a container. And in another example, the 3D imaging module 110 can synthesize information from the spatial analysis module 108, and optionally from the noise filter 106, to determine parameters for filling the one or more sub-containers based on respective three-dimensional shapes and sizes. In some cases, the semantics tool 112 determines semantics associated with the first image, the container, and the one or more sub-containers based on distinguishing features produced by the sub-container identification modules 130.

Examples of Operations for Virtual Image Processing

In some embodiments, a virtual image processing system 114 is used to augment, at least in part, images of three-dimensional containers. As described in detail with respect to the various examples below, the virtual image processing system 114 is used to obtain features associated with one or more sub-containers within a container in one or more images from the image processing system 104. For instance, the virtual image processing system 114 executes one or more virtual object selection modules 132 (or other suitable program code) for performing one or more functions used in selecting virtual objects from a virtual object database 116. The virtual object selection modules 132 optionally communicates the selected virtual objects to a virtual lighting module 126 for lighting effects or to the image mixer 134.

In an illustrative example, the image processing system 114 receives sub-container identification information and associated semantics from the image processing system 104. The virtual image processing system 114 uses the virtual object selection modules 132 to select virtual objects to augment a first image by retrieving virtual objects from the virtual object database 116. For example, the object analysis module 118 may determine three-dimensional shapes and relative sizes of one or more virtual objects that can be employed to fill one or more sub-containers within the container. In another example, the semantics pairing module 122 can perform functions similar to semantics tool 112 to determine parameters for filling the one or more sub-containers based on respective pairings of virtual objects to semantically-related sub-containers. And in another example, the position analysis module 120 can determine optimized positioning, placement, arrangement, orientation or ordering of virtual objects that can fit in the one or more sub-containers. In some examples, the semantically-related sub-containers and virtual objects can be arranged in sub-containers within the container before the virtual lighting module 126 adds lighting effects to enhance the appearance of paired sub-containers and virtual objects. The virtual image processing system 114 transmits selected virtual objects, with their respective sub-containers, and the optional lighting elements to the image mixer 134.

Examples of Operations for Image Mixing

The image mixer 134 receives, from a virtual image processing system 114, the sub-container identification information, their respective sub-container semantics, the selected virtual objects, their respective virtual object semantics and pairings, and (in some embodiments) optional lighting elements. The image mixer 134 combines the above-mentioned information to arrange and generate a second image depicting the virtual objects within each sub-container of the container of the first image. The image mixer 134 outputs the generated second image to one or more client devices 128.

In some examples, the image mixer 134 can create a rotatable three-dimensional image, which can be manipulated by a user. In additional or alternative embodiments, the rotatable three-dimensional image can be produced with a simulated rotation. It should be appreciated that the image mixer 134 may generate the second image by blending, layering, overlaying, merging, slicing, or any other suitable audio visual integration technique.

For illustrative purposes, FIG. 1 depicts an imaging system 124 having an image processing system 104 and a virtual image processing system 114. But the imaging system 124 can include any number of systems, sub-systems, or program code(s) to visually augment containers, which include one or more empty regions, with virtual elements. Further, any number or type of images may be generated for client devices 128 with the imaging system 124.

Figure 2:
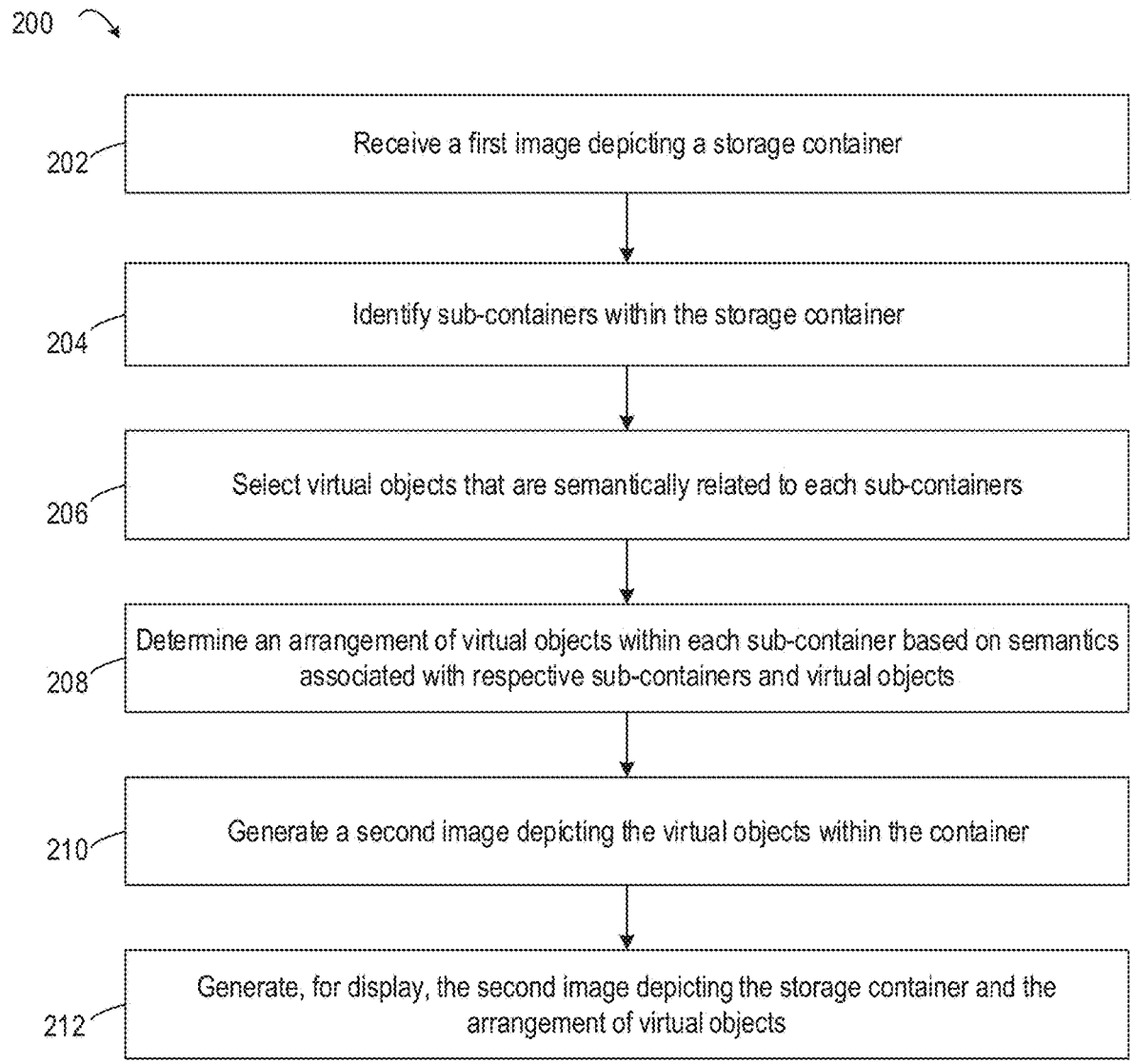
FIG. 2 depicts a process for visually augmenting images of three-dimensional containers having one or more empty regions with a semantic arrangement of virtual objects, according to certain embodiments of the present disclosure.

Examples of Operations for Augmenting Images of Containers with Virtual Elements The imaging system 124 executes one or more operations described herein to generate images that depict three-dimensional containers that store objects depicted using various virtual elements. For instance, FIG. 2 depicts a process 200 for visually augmenting images of empty three-dimensional containers with a semantic arrangement of virtual objects, according to certain embodiments of the present disclosure. In some embodiments, one or more processing devices implement operations depicted in FIG. 2 by executing suitable program code (e.g., sub-container identification modules 130, virtual objection selection modules 132, etc.). For illustrative purposes, the process 200 is described with reference to certain examples depicted in the figures. Other implementations, however, are possible.

At block 202, the process 200 involves receiving a first image depicting a storage container. Examples of received first images are described in further detail below with respect to FIGS. 3, 10, 11, 29, and 30. In one example, the imaging system 124 receives a first image depicting a storage container from the image database 102 as described above, with respect to FIG. 1. The imaging system 124 can receive the first image depicting a storage container from one or more client devices 128, an image database 102, or some combination thereof.

At block 204, the process 200 involves identifying sub-containers within the depicted storage container. In one example, the image processing system 104 employs sub-container identification modules 130 to identify information related to sub-containers within a container of the received first image. Identifying the sub-containers could include, for example, one or more of de-noising the first image, identifying three-dimensional shapes and relative sizes of one or more sub-containers within a container, and determining parameters for filling the one or more sub-containers based on respective three-dimensional shapes and sizes. Detailed examples of identifying sub-containers within a storage container of a first image are described below with respect to FIGS. 3-10.

In some embodiments, the noise filter module 106 de-noises an image of the one or more sub-containers within the container. The noise filter module 106 generates, from the received first image, a black-and-white version of a portion of the first image in which the container is depicted. The noise filter module 106 determines, from the black-and-white or gray image content, gradients associated with each sub-container within the container.

In one example, the noise filter module 106 converts the gradient image (e.g., an image depicting directional changes in color or intensity discussed above) of the container into a filtered, binarized image. A binarized image can be a black-and-white or gray image that is generated by replacing pixels in an input image based on their luminance. The binarized image is filtered to remove one or more artifacts (e.g., one or more identifiable noise elements contained within the image, including salt and pepper noise, distortion, aliasing, pixilation, checkerboarding, mosquito noise, speckles, etc.) from image content depicted in the container or in each sub-container. These artifacts are identified by employing a threshold grayscale pixel value. The noise filter module 106 can de-noise the image by removing artifacts having grayscale pixel values that are below the threshold value, creating a filtered image.

In one example, the noise filter module 106 filters an image by converting the first image to a gradient image, converting the gradient image to a binarized image, and removing noise in the binarized image, according to the techniques mentioned above, by employing a simple threshold amount, e.g., converting grayscale image pixel values above 245 or 252 to white (having a pixel value of 255). In another example, the image can be binarized by removing noise in the image based on a threshold range. For instance, a employing a threshold range can allow the noise filter module to convert pixel values below 5 to 0 (black), while also converting pixel values above 250 to 255 (white). In additional or alternative embodiments, the noise filter module 106 can remove noise from the first image using another de-noising technique, e.g., adaptive mean thresholding, adaptive Gaussian thresholding, mean filtering, box filtering, low pass filtering, linear or non-linear filtering, adaptive filtering, a combination of these, or any other suitable de-noising techniques.

In additional or alternative embodiments, the spatial analysis module 108 may identify three-dimensional shapes and relative sizes of sub-containers within a container. For instance, the spatial analysis module 108 detects a shape (e.g., a quadrilateral, circle, triangle, star, etc.) by determining mean distances between the shape's edge pixels and edge pixels of a superimposed image of the closest shape associated with the detected shape. Further, the spatial analysis module 108 can use the shape's edge pixels to detect adjacent edges of additional shapes, identifying nearby sub-containers and their respective shapes. The spatial analysis module 108 also determines the relative size of the sub-container. The relative size of a given sub-container indicates, for instance, how much of a larger container is occupied by the sub-container, how much larger or smaller the sub-container is as compared to other sub-containers within the larger container, etc. Determining the relative size of a particular sub-container includes comparing the distances between edges pixels of the particular sub-container to one or more different identified sub-containers, or a similarly sized reference container (e.g., a virtual object having a predetermined three-dimensional size, shape, or structure such as a three-dimensional cuboid or box), and using the comparison to determine a total number of virtual objects or a relative scale of candidate virtual objects. Examples of techniques for identifying three-dimensional shapes and relative sizes of sub-containers within a container are described herein with respect to FIGS. 2, 4-5, 11, 13, and 16.

The 3D imaging module 110 determines, from data outputted by the spatial analysis module 108, and based on the filtered image obtained from the noise filter 106, parameters for filling the one or more sub-containers based on respective three-dimensional shapes and sizes. Examples of these parameters include relative heights, widths, depths, vertices, edges, faces, etc. of a sub-container to assist with the selection of candidate virtual objects, which will be discussed below. For instance, the 3D imaging module 110 uses the shapes and sizes outputted by the spatial analysis module 108 to determine features of sub-containers and their respective three-dimensional shapes. To do so, the 3D imaging module 110 determines sizes and relative locations of sub-containers within a container. The 3D imaging module 110 uses these sizes and relative locations to identify vertices, edges, and faces of with the sub-containers. For instance, the 3D imaging module 110 identifies intersectional points of adjacent candidate sub-containers from determinations made by the spatial analysis module 108. These intersectional points could be vertices of coupled planar surfaces of a sub-container to determine the height, width, and depth of a three-dimensional box.

At block 206, the process 200 involves selecting virtual objects that are semantically related to each of the sub-containers. For example, one or more of the semantics pairing module 122 and the semantics tool 112 determines parameters for filling one or more sub-containers based on pairings of virtual objects to semantically-related sub-containers. Examples of selecting virtual objects that are semantically related to each of the sub-containers are described in further detail below with respect to FIGS. 11-12.

In one example, the virtual image processing system 114 receives sub-container identification information and their respective semantics from the image processing system 104 associated with an empty storage container of an image, e.g., relative heights, widths, depths, vertices, edges, faces, etc. of a sub-container from the 3D imaging module 110 discussed above. In another example, the virtual image processing system 114 allows the virtual object selection modules 132 to select virtual objects to augment the first image by retrieving virtual objects from a virtual object database 116.

For instance, the object analysis module 118 may determine three-dimensional shapes and relative sizes of one or more virtual objects that can be employed to fill one or more sub-containers within the container. In another example, the position analysis module 120 can determine optimized positioning, placement, arrangement, orientation, or ordering of virtual objects that can fit in the one or more sub-containers.

At block 208, the process 200 involves determining an arrangement of virtual objects within each sub-container based on semantics associated with their respective sub-containers and virtual objects. As mentioned above, semantics are identifiable attributes related to objects that enable the formation of relationships between objects. And in some examples, a semantics pairing module 122 uses data from semantics tool 112 to identify attributes that are logically related to one or more virtual objects identified by the object analysis module 118. Additional examples of determining an arrangement of virtual objects within each sub-container based on semantics associated with their respective sub-containers and virtual objects are described in further detail below with respect to FIGS. 13-19.

For instance, the semantics pairing module 122 can determine a specific sub-container, e.g., a shelf within a refrigerator, is semantically related to a virtual object identified by the object analysis module 118, such as a virtual cake in a virtual domed cake plate. In one example, the semantics pairing module 122 determines the virtual domed cake plate is a candidate object based on another desert present within the refrigerator container and on the same shelf sub-container. In another example, the semantics pairing module 122 can determine that the virtual domed cake is a highly appealing virtual image based on previous user interactions associated with the requester and that a specific shelf sub-container is an ideal location for the virtual cake and virtual domed cake plate based on the relative sizes of the virtual cake and other virtual candidate objects, e.g., smaller food items such as grapes, olives, carrots, etc. In additional or alternative embodiments, the semantics pairing module 122 can use any number or combination of semantics to match one or more virtual objects to one or more related sub-container.

For instance, returning to the refrigerator, the semantics pairing module 122 can determine semantics related to food, a type of food, and a relative location of one type of food to another. Specifically, in one example, the semantics pairing module 122 can determine a virtual object to fill a sub-container of a fruit drawer in a refrigerator is a virtual apple, using the semantic attributes of "food" and "fruit" to determine the relationship between the refrigerator's fruit drawer and the specific virtual food object of the virtual apple.

With respect to the example of pairing a fruit drawer and a virtual apple, the semantics pairing module 122 can also determine that additional fruit, such as virtual grapes, should also be paired with the virtual apple in the virtual fruit drawer of the refrigerator. In such a case, the semantics pairing module 122 can also use the semantics of the two types of fruit to determine a relative location of the two types of fruit within the fruit drawer sub-container. For instance, the semantics pairing module 122 can use semantics associated with the average size, relative size, height, weight, density, proportions, textures, etc. of both virtual fruits to determine that virtual apples should be paired with the fruit drawer in a visually lower location than the respective location of the virtual grapes.

As mentioned above, the position analysis module 120 can determine optimized positioning, placement, arrangement, orientation, or ordering of virtual objects that can fit in the one or more sub-containers. The position analysis module 120 uses information obtained from object analysis module 118, and optionally from semantics pairing module 122, to determine an optimal arrangement of virtual objects, filling one or more sub-containers by employing a number of parameters to create a desired visual appeal. For instance, the object analysis module 118 can provide virtual food items based on the identification of a refrigerator container, and the semantics pairing module 122 can pair virtual apples and virtual grapes to a sub-container fruit drawer as described above. Using this information, the position analysis unit 120 can determine rotational angles associated with the substantially spherical or ellipsoidal virtual fruits to orient and place the virtual apples and virtual grapes in positions, having specified orientations, that appear natural from the perspective of a viewer. For instance, the position analysis unit 120 can use the substantially spherical shape of a virtual apple, or the substantially ellipsoidal shape of a virtual grape to determine a centroid (e.g., a central point associated with the three-dimensional shape of a virtual object, which would substantially correspond to a center of mass associated with a real object having a uniform density) for each respective virtual fruit. Using such a centroid for each virtual fruit, the position analysis unit 120 can optimize placement, fit, and orientation by three-dimensionally rotating each fruit around one or more of the three axes corresponding to its respective centroid.

In additional or alternative embodiments, the virtual lighting module 126 adds lighting effects to virtual objects within a sub-container. After identifying, pairing, and arranging virtual objects in a sub-container, lighting or the absence thereof, may result in a less desirable aesthetic. To augment the arranged virtual objects, it may be advantageous to add lighting effects to the virtual objects and their sub-containers to increase a sense realism of the arrangement. The virtual lighting module 126 can determine an amount of ambient light (e.g., an average, mean, or median amount of global illumination) present in an image received from the image processing system 104. Using this amount of ambient light, or alternatively increasing or decreasing the ambient light, the virtual lighting module 126 can add a virtual lighting source to determine a vector of diffuse lighting (e.g., lighting that is perpendicularly reflective of a surface of a virtual object) and one or more vectors of specular lighting (e.g., a projected lighting angle based on a speculative viewing angle or range of angles) associated with one or more of the virtual objects or surfaces of one or more sub-containers.

For instance, and continuing with the virtual fruits examples above, the virtual lighting module 126 can determine an ambient amount of light present in the first image of the refrigerator. The virtual lighting module 126 also identifies a light source contained within the refrigerator as a refrigerator light bulb. Using information from the 3D imaging module 110, the virtual lighting module can determine a diffuse lighting vector for each virtual apple and each virtual grape, as well as the fruit drawer sub-container. Similarly, the virtual lighting module 126 can determine one or more specular lighting vectors for the virtual apples, virtual grapes, and fruit drawer sub-container. Using the ambient lighting, diffuse lighting vectors, and specular lighting vectors, the virtual lighting module 126 creates a combined virtual lighting effect that can augment the arrangement of the virtual fruits in the fruit drawer sub-container.

In additional or alternative embodiments, the virtual lighting module 126 can repeat this process for each respective virtual object in their respective sub-containers. In one example, the virtual lighting module 126 determines a lack of ambient light in an original image requires an increased amount of virtual ambient light to be added to the first image. In another example, the virtual lighting module 126 determines an adequate amount of light is present for an existing surface of one or more sub-containers, only adding virtual lighting effects to the surfaces of the virtual objects. In some examples, the virtual lighting module can add one of ambient, diffuse, specular virtual effects or any combination of these. And in some examples, the virtual lighting module 126 can employ information related to a surface of virtual object or sub-container (e.g., texture, reflectivity, color, shape, relative position or elevation, flatness, proximity to other objects or edges, contrast, etc.) to determine an amount of ambient, diffuse, specular virtual effects or any combination of these.

In additional or alternative embodiments, the image mixer 134 combines the information obtained from the first image by the virtual image processing system 114 to generate image data depicting an arrangement of the virtual objects within each sub-container of the container. In another example, the virtual image processing system 114 arranges a second image depicting the virtual objects within each sub-container of the container of the first image.

At block 210, the process 200 involves generating a second image depicting the virtual objects within the container. The second image includes the image data depicting the arrangement that is generated in block 208. In one example, the image mixer 134 combines the information from the virtual image processing system 114 to generate the second image. Examples of generating a second image depicting the virtual objects within the container are described in further detail below with respect to FIGS. 14-23, 29, and 30.

At block 212, the process 200 involves generating, for display, the second image depicting the storage container and the arrangement of the virtual objects. The image mixer 134 outputs the second image depicting the virtual objects within each sub-container of the container of the first image to one or more client devices 128. In some examples, the image mixer 134 transmits the second image depicting the virtual objects within each sub-container of the container of the first image to one or more client devices 128. In this instance, the client devices output the second image. Examples of generating, for display, the second image depicting the storage container and the arrangement of the virtual objects are described in further detail below with respect to FIGS. 16-23, 29, and 30.

Figure 3:
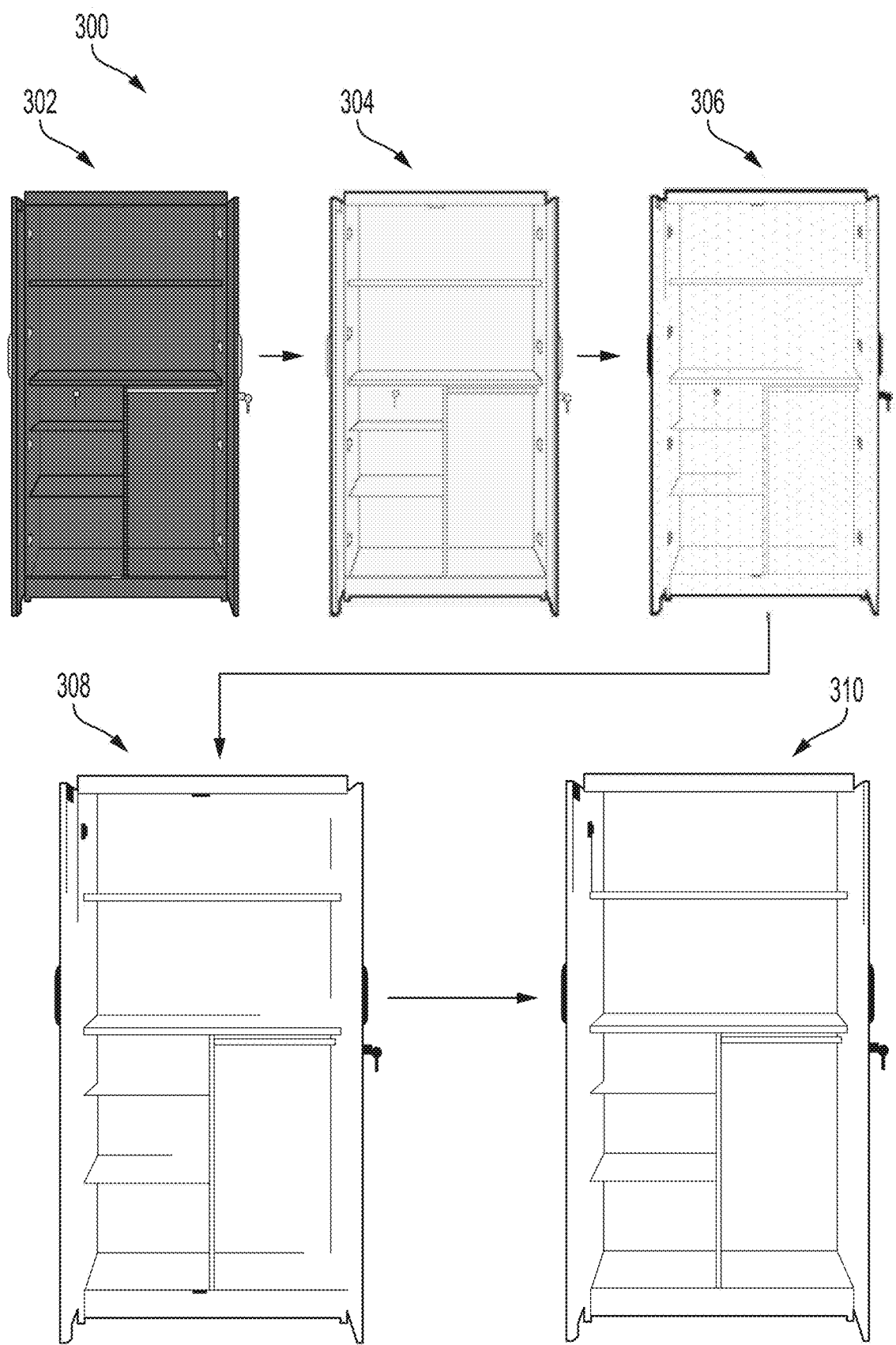
FIG. 3 depicts an example of receiving and automatically identifying an image of a container for the process of FIG. 2, according to certain embodiments of the present disclosure.

The following example is provided to illustrate a potential application of the operations described above. In particular, FIG. 3 depicts an example 300 of receiving and automatically identifying an image of a container for the process of FIG. 2, according to certain embodiments of the present disclosure. In this example, an image depicting an open-doored armoire is received, identified, and binarized according to certain aspects of embodiments discussed herein.

In the example depicted in FIG. 3, similar to block 202 of process 200, the imaging system 124 receives and identifies a photograph 302 of the open-doored armoire from image database 102 or a client device 128. In some examples, the image processing system 104 can also identify metadata associated with the photograph 302. For instance, the photograph 302 of the open-doored armoire can include identifying metadata such as a creator, creation location, creation time, brand name, image title, one or more captions, keywords, technical details, digital rights, or any combination of these associated with the photograph 302.

In the example depicted in FIG. 3, similar to block 204 of process 200, the image processing system 104 also includes sub-container identification modules 130. Specifically, noise filter module 106, discussed above with respect to block 204 of the process 200, de-noises the photograph 302 of the open-doored armoire in a substantially similar manner. In this example, the noise filter module 106 receives the photograph 302 and determines a grayscale image 304 of the identified container (e.g., the open-doored armoire).

In some examples, the noise filter module 106 also determines the presence of gradients. As discussed above, with respect to block 204 of FIG. 2, the noise filter module 106 can identify gradients in the first image by employing a threshold algorithm. In this example, the noise filter module 106 can apply a simple threshold, e.g., using pixel value 252, to create a binarized image 306. In additional or alternative embodiments, the noise filter module 106 can de-noise the binarized image 306, creating filtered image 308 of the open-doored armoire. In one example, the noise filter module 106 can determine shapes according to techniques discussed herein. In such an example, the noise filter module 106 can determine various quadrilaterals present in the open-doored armoire, identifying broken components of the filtered image 308. The noise filter module 106 can connect these broken components by adding black pixels to the filtered image, resulting in a sharpened image 310.

For illustrative purposes, FIG. 3 and the accompanying description above refer to an image depicting an identified, open-doored armoire. But implementations with different containers, varying numbers of sub-containers, threshold values, sizes, etc. are possible. For instance, in some embodiments, the image is graphical image, virtual image, or more than one photograph. The binarization may include an additional, lower threshold value, creating a range of de-noising to binarize an image.

Figure 4:
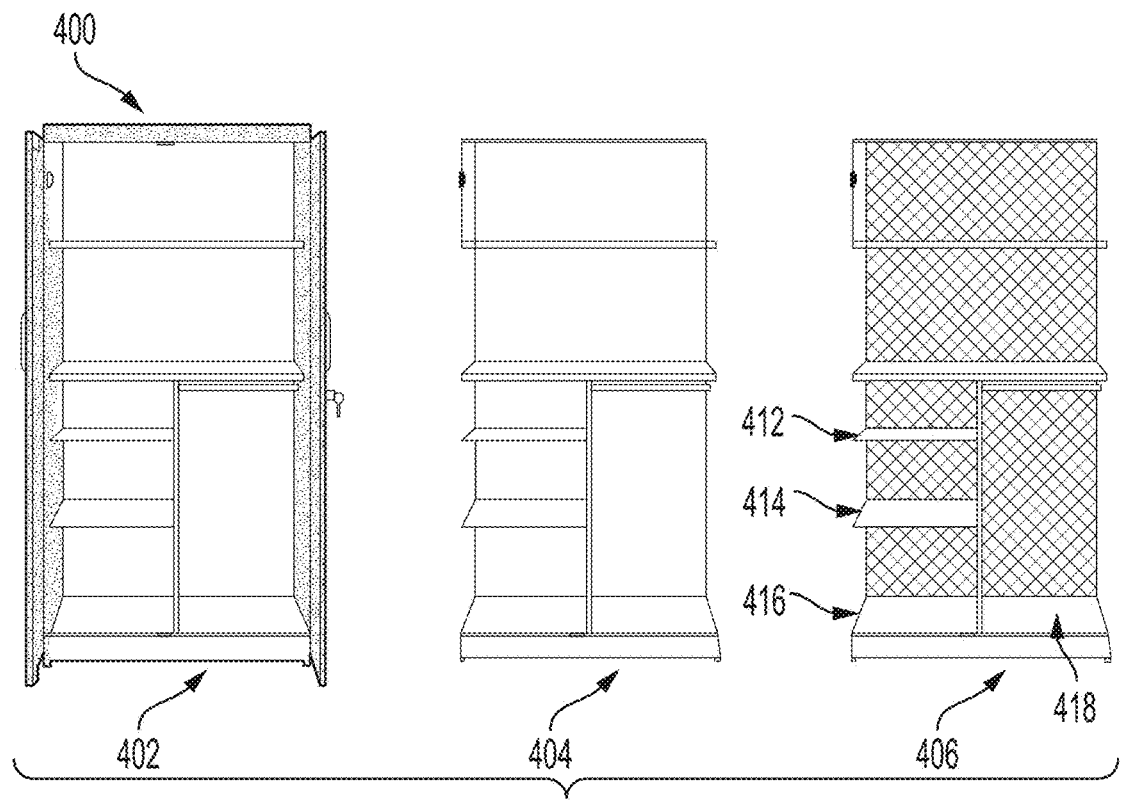
FIG. 4 depicts an example of automatically identifying sub-containers within an image of a container for the process of FIG. 2, according to certain embodiments of the present disclosure.

FIG. 4 depicts an example 400 of automatically identifying sub-containers within a first image of a container for the process of FIG. 2, according to certain embodiments of the present disclosure. In this example, an image depicting sub-containers of the open-doored armoire, discussed above with respect to FIG. 3, are identified according to certain aspects of embodiments discussed herein.

In the example 400 depicted in FIG. 4, similar to block 204 of process 200, the spatial analysis module 108 of image processing system 104 identifies sub-containers within an image by receiving the sharpened image 310 of the open-doored armoire from the noise filter module 106 discussed above with respect to FIG. 3. In example 400, the spatial analysis module 108 performs a connected component analysis ("CCA") of the sharpened image 310, e.g., detecting and labeling connected regions of the binary image—sharpened image 310. Performing the CCA, the spatial analysis module 108 can label each region, e.g., blob, in the sharpened image 310 with a unique identifier. In some examples, the CCA can employ a single-pass algorithm, two-pass algorithm, sequential algorithm, a combination of these, or any other suitable CCA technique for the detection and labeling of connected components.

In this example 400, the spatial analysis module 108 performs the CCA to determine that the two largest components are the opened doors of the first image 402 depicting the open-doored armoire. Further, the spatial analysis module 108 can determine, based on a comparative analysis of similar items, using the identification techniques discussed herein or the metadata received by image processing system 104, that the first image 402 of the open-doored armoire is front-facing. The spatial analysis module 108 is able to remove the doors from the first image 402 to create a modified image 404 of the open-doored armoire.

The spatial analysis module 108 performs a blob count of all of the regions depicted in the modified image 404. Additionally, the spatial analysis module 108 detects the shapes associated with each of the blobs in the modified image 404 of the open-doored armoire container. In this example 400, the spatial analysis module 108 determines the blob shapes are quadrilaterals. In some examples, one or more edges of a blob may be rounded, however, the spatial analysis module 108 can still determine the substantially similar to a quadrilateral.

Returning to the example 400, the spatial analysis module 108 determines the labeled blobs are quadrilaterals based on the relative locations of the connected corners using the CCA technique discussed above. The spatial analysis module 108 determines whether the quadrilateral depicted in the modified image 404 is substantially rectangular. In some examples, the spatial analysis module 108 can determine a shape is substantially rectangular by comparing the relative heights and widths of the shape. In other examples, the spatial analysis module determines the shape is substantially rectangular by determining the angles associated with opposing vertices are both substantially right angles.

The spatial analysis module 108 can determine whether a substantially rectangular shape is associated with the front, back, or a sub-container of the modified image 404. For instance, the spatial analysis module 108 uses the CCA information to determine whether substantially rectangular components are connected to either (1) another type of quadrilateral, e.g., a substantially non-rectangular parallelogram, rhombus, trapezoid, trapezium, kite, etc., or (2) a substantially smaller quadrilateral, e.g., having a width below a threshold number of pixels. In the example 400, if the spatial analysis module 108 makes either determination described above, then the spatial analysis module 108 determines the connected component has a rearward location within the modified image 404 of the open-doored armoire.

For instance, in this example, the spatial analysis module 108 determines the lattice-patterned portions corresponding to their respective substantially rectangular shapes are in a relative rearward location. To do so, spatial analysis module 108 uses the CCA information to determine that the shapes of anterior components 412, 414, 416, and 418 are substantially non-rectangular parallelograms. This determination is made based on the shapes of anterior components 412, 414, 416, and 418 having three-dimensional angular properties that present as substantially trapezoidal shapes, having substantially parallel horizontal sides, and substantially non-parallel vertical edges. As mentioned above, the spatial analysis module 108 can determine the lattice-patterned portions corresponding to their respective substantially rectangular shapes are in a relative rearward location by using the CCA information to determine the relative sizes of anterior components 412, 414, 416, and 418. For instance, each of the substantially non-rectangular parallelograms 412, 414, 416, and 418 have angular properties that present as substantially trapezoidal shapes, in that these shapes include substantially non-parallel sides. For a given one of the substantially non-rectangular parallelograms 412, 414, 416, and 418, the spatial analysis module 108 can determine that the shape's area or heights associated with the shape's substantially non-parallel sides are substantially smaller than a substantially rectangular component (e.g., one of the lattice-patterned portions) to which the shape is adjacent. These substantially trapezoidal shapes, as well as the differences in size between the non-rectangular parallelograms and the adjacent lattice-patterned portions, result from the lattice-patterned portions being further from a camera capturing an image in the example 400 or an artist using perspective techniques to depict the lattice-patterned portions being further away in a three-dimensional space, which in turn indicates that the lattice-patterned portions are rearward located. By identifying the lattice-patterned portions as being rearward located, and anterior components 412, 414, 416, and 418, which represent other surfaces within the modified image 404 of the open-doored armoire, the spatial module 108 creates a geospatial image 406 of the open-doored armoire.

Figure 5:
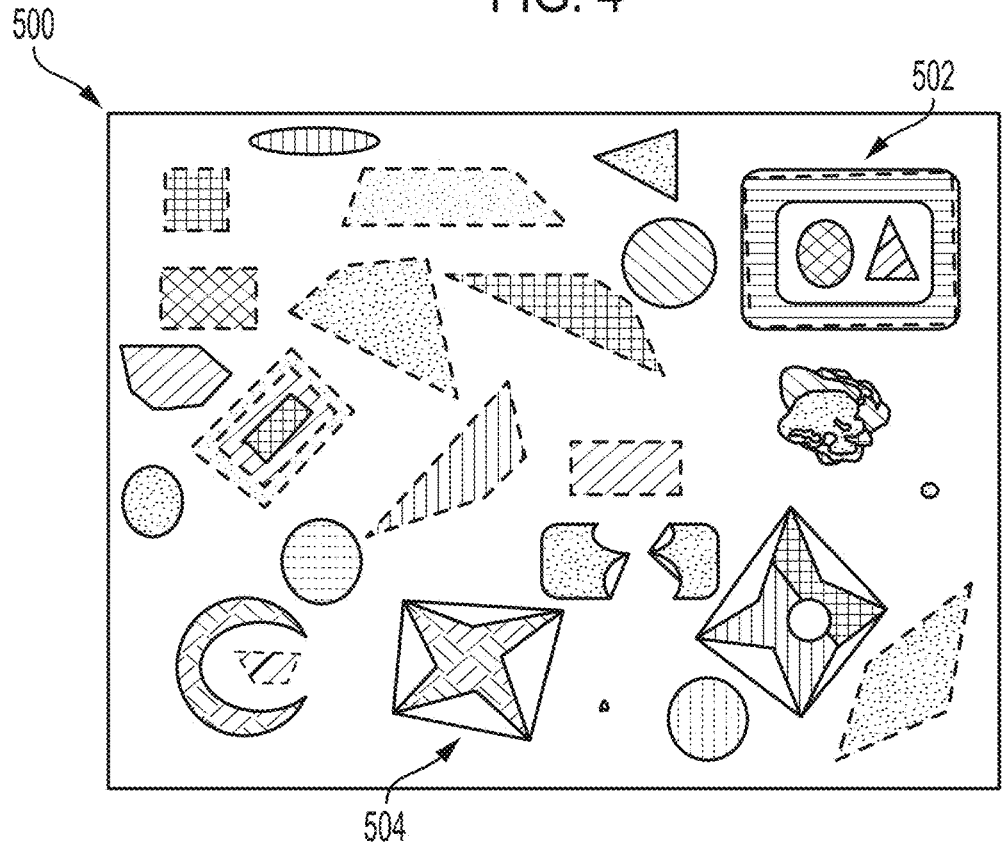
FIG. 5 depicts a simplified example of shapes that can be detected when automatically identifying sub-containers within an image of a container for the process of FIG. 2, according to certain embodiments of the present disclosure.

FIG. 5 depicts a simplified example in which shapes in an image 500 can be detected. The process used to detect certain shapes in FIG. 5 can be used for automatically identifying sub-containers within an image of a container for the process of FIG. 2. For instance, while FIG. 5 does not depict a container and sub-containers, the functions described below with respect to the example of FIG. 5 could be used to detect sub-containers, which might be the quadrilateral-shaped objects in an image depicting a container. Thus, the functions described in this example with respect to the shapes in FIG. 5 can be applied to implement the identification of sub-containers in the process of FIG. 2.

In this illustrative example, the spatial analysis module 108 distinguishes quadrilaterals from other types of shapes in the image 500. Quadrilaterals can be detected because, for instance, a quadrilateral shape is more likely to be a depicted sub-container (e.g., a drawer, a shelf, etc.). For illustrative purposes, the image 500 includes various spatially separated objects, but the spatial analysis module 108 can also be applied to a set of contiguous objects in an image, such as drawers and shelves of a refrigerator depicted in an image.

In the example shown in FIG. 5, similar to block 204 of process 200, the spatial analysis module 108 identifies blobs (i.e., objects in the image 500) contained within an image 500. To do so, the spatial analysis module 108 locates and counts blobs, in a manner similar to the CCA technique described above with respect to FIG. 4. In the example depicted in FIG. 5, the spatial analysis module 108 counts the number of blobs in image 500 and thereby identifies the 26 objects depicted in image 500. The spatial analysis module 108 also overlays quadrilaterals on the blobs. A quadrilateral for a given blob is defined by connecting the outermost edge points of the blob. These overlaid quadrilaterals are used to determine whether various blobs have a quadrilateral shape. For instance, the spatial analysis module 108 determines that the blob represented by object 502 is a quadrilateral. Conversely, a quadrilateral connecting and outlining the outermost edge points of the blob represented by object 504 contains edges that significantly deviate, in distance and angular directionality, from the edges of the quadrilateral overlaying the substantially star-shaped object, so the spatial analysis module 108 determines that the object 504 is not a quadrilateral.

For instance, in the image 500, the object 502 illustrates a four-sided polygon having rounded edges. The spatial analysis module 108 overlays a quadrilateral on the object 502, where the quadrilateral is formed by connecting edge points of the object 502. In this example, drawing a quadrilateral-shaped outline connecting the outermost edge points of the object 502 in image 500 results in a bounded quadrilateral that is contained within the object 502. For illustrative purposes, FIG. 5 depicts this bounded quadrilateral using a dashed outline. In this example, the spatial analysis module 108 determines that the quadrilateral associated with the object 502 does not significantly deviate from the shape of the object 502. This determination is made based on an average maximum distance of the four sides of the object 502 and the furthest points of the corresponding edges of the quadrilateral associated with the object 502.

Similarly, FIG. 5 also depicts a quadrilateral that is formed by connecting the respective outermost edge points of the object 504, where the quadrilateral is illustrated in FIG. 5 as a dashed outline. But in this example, the substantially star-shaped object 504 contains edges that represent a significant deviation from the quadrilateral that is associated with the object 504. Specifically, the object 504 contains edges that are segmented bisectors, appearing to be askew and incongruous from all four of the corresponding sides of the quadrilateral. The spatial analysis module 108 determines that object 504, having segmented bisection points corresponding to the furthest points away from each respective side of the corresponding quadrilateral, has an average maximum distance of the four sides between itself and the corresponding quadrilateral. The spatial analysis module 108 also determines whether the determined average maximum distance of the object 504 to its corresponding quadrilateral exceeds a threshold value. If this threshold value is exceeded, then the object 504 is not classified as a quadrilateral by the spatial analysis module 108.

This technique can be performed for each blob that is identified within the image 500. For instance, the same type of comparison of an average maximum distance to a threshold described above (i.e., the comparison used to determine that object 504 is not a quadrilateral) is used by the spatial analysis module 108 to classify other blobs, such as the object 502, as quadrilaterals.

For illustrative purposes, the example of FIG. 5 is described with respect to the processing that classifies two objects 502 and 504 as having or lacking a quadrilateral shape. The process described above with respect to FIG. 5 can be iteratively performed for multiple objects in an image. For instance, the process described above with respect to FIG. 5 can be performed iteratively, where each iteration analyzes a different object in the image and determines whether the object is a quadrilateral.

Figure 6:
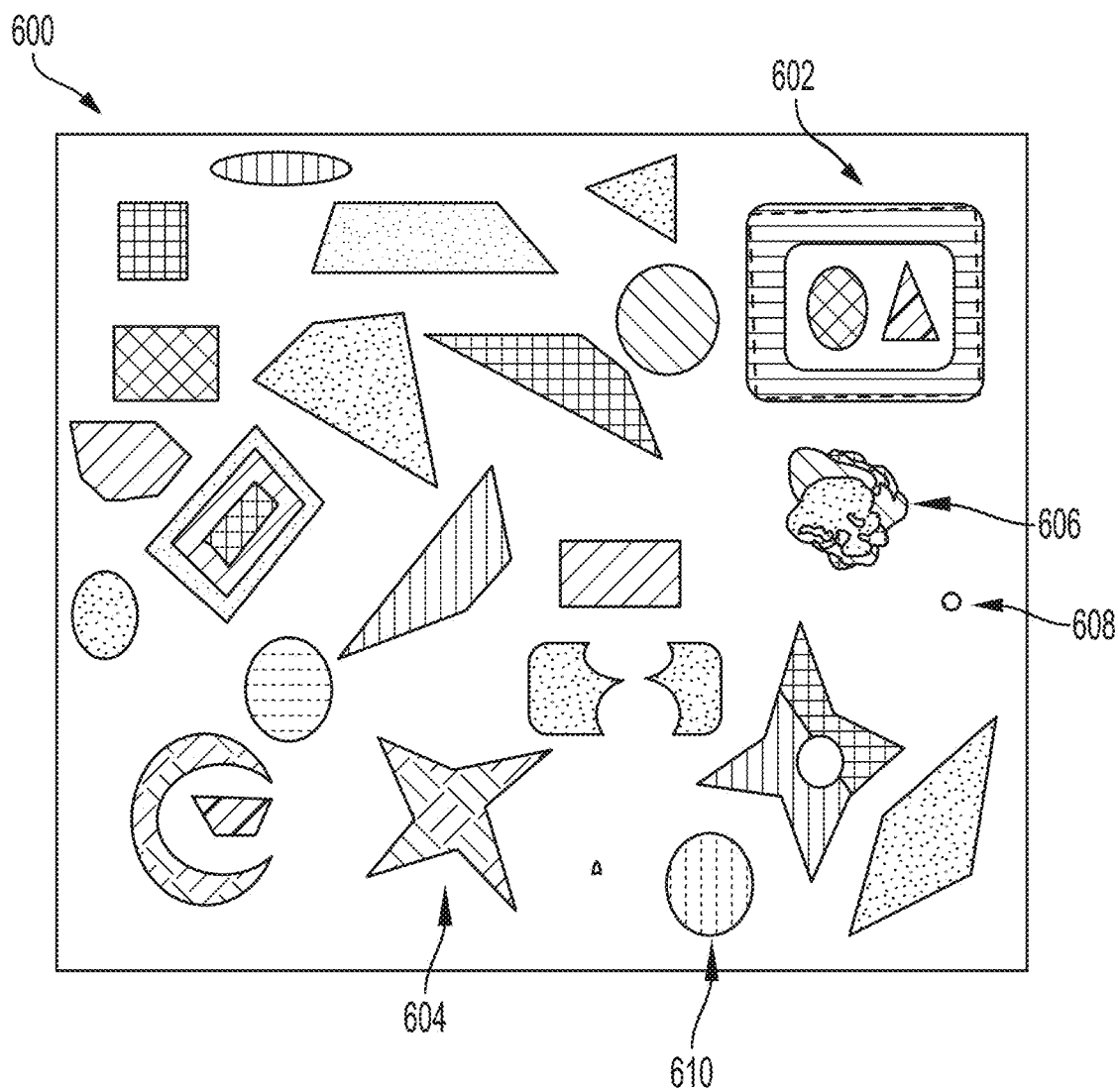
FIG. 6 depicts another simplified example of shapes that can be detected when automatically identifying sub-containers within an image of a container for the process of FIG. 2, according to certain embodiments of the present disclosure.

FIG. 6 depicts another simplified example in which shapes in an image 600 can be detected. The process used to detect certain shapes in FIG. 6 can be used for automatically identifying sub-containers within an image of a container for the process of FIG. 2, according to certain embodiments of the present disclosure. For instance, while FIG. 6 does not depict a container and sub-containers, the functions described below with respect to the example of FIG. 6 could be used to detect sub-containers, which might be the quadrilateral-shaped objects in an image depicting a container. Thus, the functions described in this example with respect to the shapes in FIG. 6 can be applied to implement the identification of sub-containers in the process of FIG. 2.

In this illustrative example, the spatial analysis module 108 uses a technique similar to that discussed above with respect to the image 500 shown in FIG. 5. The spatial analysis module 108 is also used to detect quadrilaterals, in this example, because quadrilateral shapes are more likely to be a depicted sub-container (e.g., a drawer, a shelf, etc.). For illustrative purposes, the image 600 includes various spatially separated objects, but the spatial analysis module 108 can determine a set of contiguous objects in an image, such as the drawers and shelves of a refrigerator depicted in an image.

In the example shown in FIG. 6, the spatial analysis module 108 determines which blobs in the image 600 have four edge points. The spatial analysis module 108 counts the number of blobs having four edge points, and excludes blobs with a different number of edge points from this counting operation. By limiting the counted blobs to only those containing the number of edge points that a quadrilateral would have, the spatial analysis unit can reduce the number of iterations required to be processed by the spatial recognition module 108. For instance, the spatial recognition module 108 can determine that the blob represented by the object 602 still contains four edge points, despite the existence of its substantially rounded corners.

In this example, the spatial recognition module 108 also determines that the substantially star-shaped blob represented by the object 604 contains eight edge points, and based on that determination, the need for further analysis of its conformity to a substantially-quadrilateral shape is reduced. In addition, the spatial recognition module 108 can determine that irregularly-shaped blobs, such as the blob represented by the object 606, or blobs that are below a threshold size, such as the blob represented by the object 608, need not be analyzed based on one or more predetermined threshold parameters, e.g., volumetric size, relative size, spatial location within the image 600, shape, etc. Further, the spatial recognition module 108 eliminates substantially circular or ovular shapes such as the blobs represented by objects 608 and 610 because neither object has an identifiable edge point.

In FIG. 6, the functions performed by the spatial recognition module 108 described above for the image 600 result in increased processing efficiencies. For instance, the blob represented by the object 604 is substantially similar to the blob represented by the object 504 discussed above. However, in this example, the spatial recognition module 108 merely performs a confirmation of an object after an indication that the object has four edge points, thereby increasing the likelihood the object will be identified as a quadrilateral. After identifying a reduced set of blobs to analyze, the spatial recognition module 108 determines which objects have shape that significantly deviate from a quadrilateral associated with the object. A quadrilateral associated with the object is a quadrilateral that could be drawn by connecting the four edge points with straight lines. As with FIG. 5, an example of such a quadrilateral is illustrated in FIG. 6 using a dashed outline.

In this example, the object 604 has a shape that significantly deviates from an associated quadrilateral, whereas the object 602 has a shape that is much closer to an associated quadrilateral. Identifying the presence or absence of such deviations can be used to detect sub-containers because, for example, an object's shape being closer to a quadrilateral is indicative of the object being a depicted sub-container.

Figure 7:
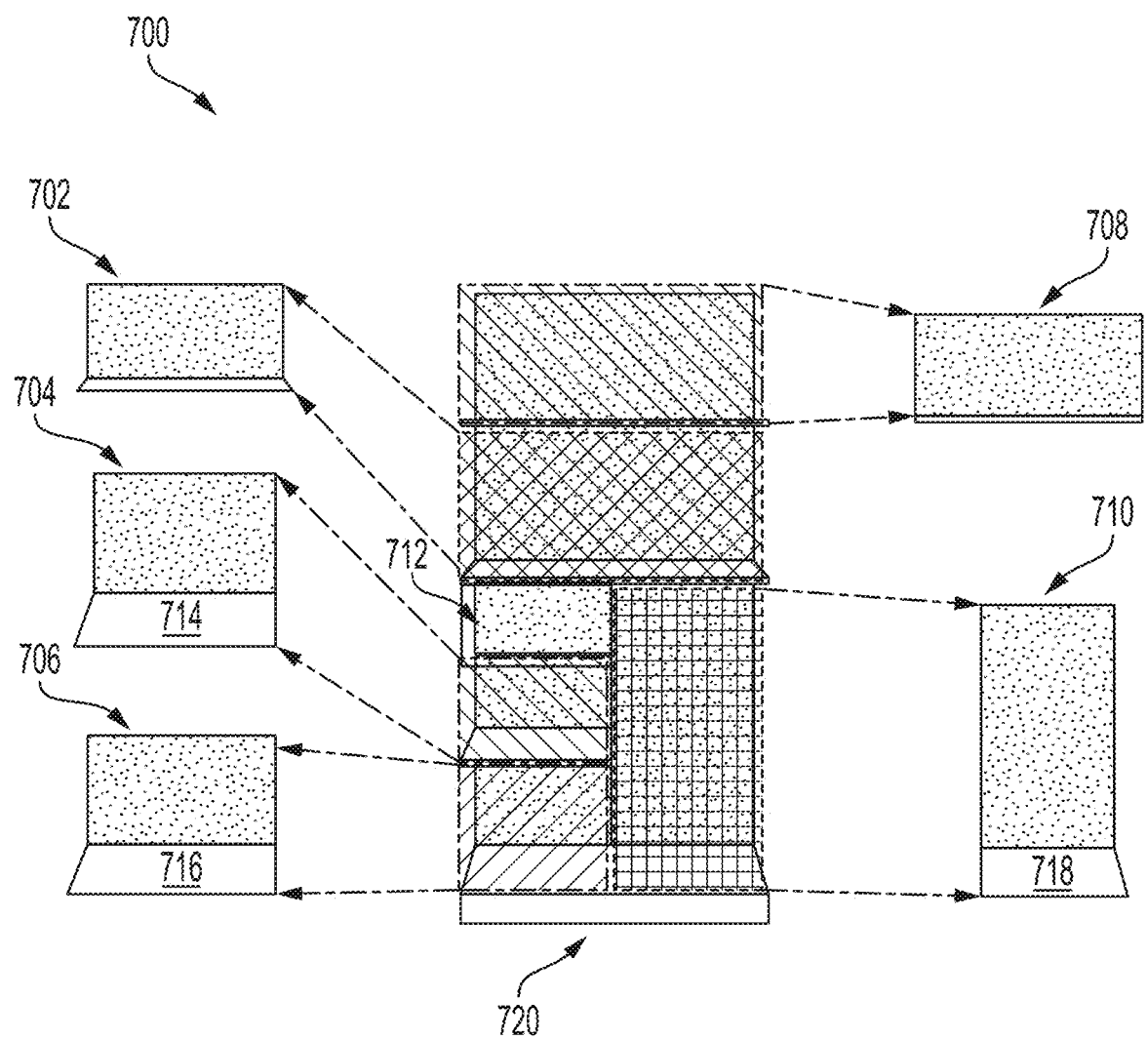
FIG. 7 depicts another example of automatically identifying an image of a container for the process of FIG. 2, according to certain embodiments of the present disclosure.

FIG. 7 depicts another example 700 of receiving and automatically identifying an image of a container for the process of FIG. 2, according to certain embodiments of the present disclosure. In this example, an image depicting sub-containers of the open-doored armoire, discussed above with respect to FIG. 4, are identified according to certain aspects of embodiments discussed herein.

In the example 700 depicted in FIG. 7, similar to block 204 of process 200, the 3D imaging module 110 of image processing system 104 identifies sub-containers within an image, receiving a geospatial image 720 of the open-doored armoire from the spatial analysis module 108. The geospatial image 720 is substantially similar to the geospatial image 406 discussed above with respect to FIG. 4. For instance, rearward components 702, 704, 706, 708, and 710 of the geospatial image 720 are substantially similar to the speckled rearward components of the geospatial image 406.

Further, anterior components 712, 714, 716, and 718 of the geospatial image 720 are substantially similar to the anterior components of the geospatial image 406. In example 700, the 3D imaging module 110 identifies non-near rectangular quadrilateral components associated with connected components of the geospatial image 720.

For instance, the 3D imaging module 110 can independently determine non-near rectangular quadrilateral components by identifying the four corners of the non-near rectangular quadrilateral components connected for each of the previously-determined rearward components 702, 704, 706, 708, and 710. In example 700, the 3D imaging module 110 can determine the four corners associated with the non-near rectangular quadrilateral components, e.g., 714, 716, and 718. The 3D imaging module 110 determines a 3D plane associated with each of the non-near rectangular quadrilateral components.

Figure 8:
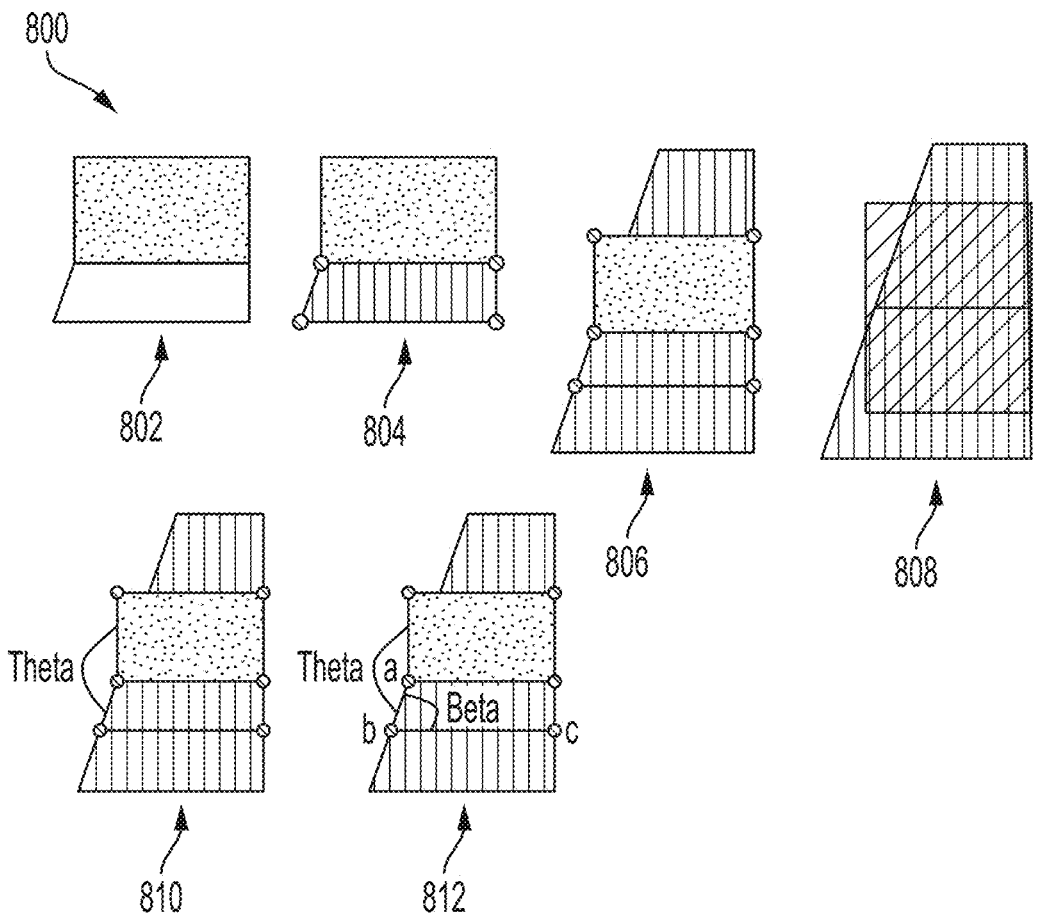
FIG. 8 depicts another example of automatically identifying sub-containers within an image of a container for the process of FIG. 2, according to certain embodiments of the present disclosure.

FIG. 8 depicts another example 800 of automatically identifying sub-containers within an image of a container for the process of FIG. 2, according to certain embodiments of the present disclosure. In this example, the 3D imaging module 110 uses the non-near rectangular quadrilateral components, e.g., sub-containers, of the open-doored armoire, discussed above with respect to FIGS. 3, 4, and 7, to determine angles of rotation for sub-containers according to certain aspects of embodiments discussed herein.

In the example 800 depicted in FIG. 8, similar to block 204 of process 200, the 3D imaging module 110 of image processing system 104 identifies sub-containers within an image, based on the geospatial image 720 of the open-doored armoire shown in FIG. 7. In example 800, the 3D imaging module 110 identifies angles of rotation associated with connected components of the geospatial image 720 shown in FIG. 7. The 3D imaging module 110 can independently determine angles of rotation for connected components by defining a horizontal and a vertical axis.

For instance, the 3D imaging module 110, using the determination of the four corners associated with the non-near rectangular quadrilateral components, e.g., 714, 716, and 718 shown in FIG. 7, to identify a connected components 802 having a rearward component connected to a non-near rectangular quadrilateral component. The 3D imaging module 110 identifies the corners of the non-near rectangular quadrilateral component in the first image of the connected components 804 to define a corresponding horizontal plane. The 3D imaging module 110 also identifies the corners of the rearward component in the first image of the connected components 806 to define a corresponding vertical plane.

An image 808 represents the intersection of the horizontal and vertical planes defined by the 3D imaging module 110. The 3D imaging module 110 can determine an angle theta in an image 810 based on the intersecting planes shown in the image 808. In some examples, such a determination enables the 3D imaging module 110 to rotate the image 810 about the vertical axis. In other examples, the 3D imaging module 110 determines the angle beta based on points a, b, and c, enabling the 3D imaging module 110 to rotate the image 812 about the horizontal axis.

Figure 9:
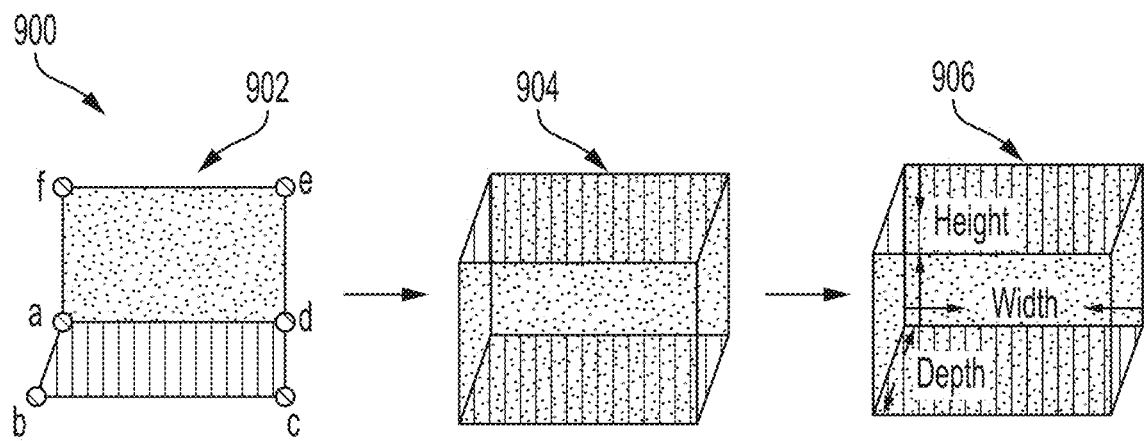
FIG. 9 depicts another example of automatically identifying sub-containers within an image of a container for the process of FIG. 2, according to certain embodiments of the present disclosure.

FIG. 9 depicts another example 900 of automatically identifying sub-containers within an image of a container for the process of FIG. 2, according to certain embodiments of the present disclosure. In this example, the 3D imaging module 110 uses identified corners associated with rearward components and connected non-near rectangular quadrilateral components, e.g., sub-containers, of the open-doored armoire, discussed above with respect to FIGS. 3, 4, 7, and 8, to determine dimensions of a sub-container according to certain aspects of embodiments discussed herein.

In the example 900 depicted in FIG. 9, similar to block 204 of process 200, the 3D imaging module 110 of image processing system 104 identifies sub-containers within an image, based on the geospatial image 720 of the open-doored armoire shown in FIG. 7. In example 900, the 3D imaging module 110 identifies dimensions associated with rearward components and connected non-near rectangular quadrilateral components, e.g., using the geospatial image 720 shown in FIG. 7 and the horizontal and vertical planes defined in the image 812 shown in FIG. 8.

For instance, the 3D imaging module 110 can determine the depth of a sub-container depicted in an image 904 by employing the angle beta, shown in the image 812, to calculate the Euclidian distance between points a and b, identified in an image 902. Similarly, the 3D imaging module 110 can determine a height of the sub-container using points a and f and angle theta, shown in the image 812. Further, the 3D imaging module 110 can determine a width of the sub-container based on the height and depth determinations above. In some examples, the 3D imaging module 110 can repeat the determinations made above, defining dimensions for the substantially cubic sub-container depicted in an image 906, for each sub-container identified in a container.

Figure 10:
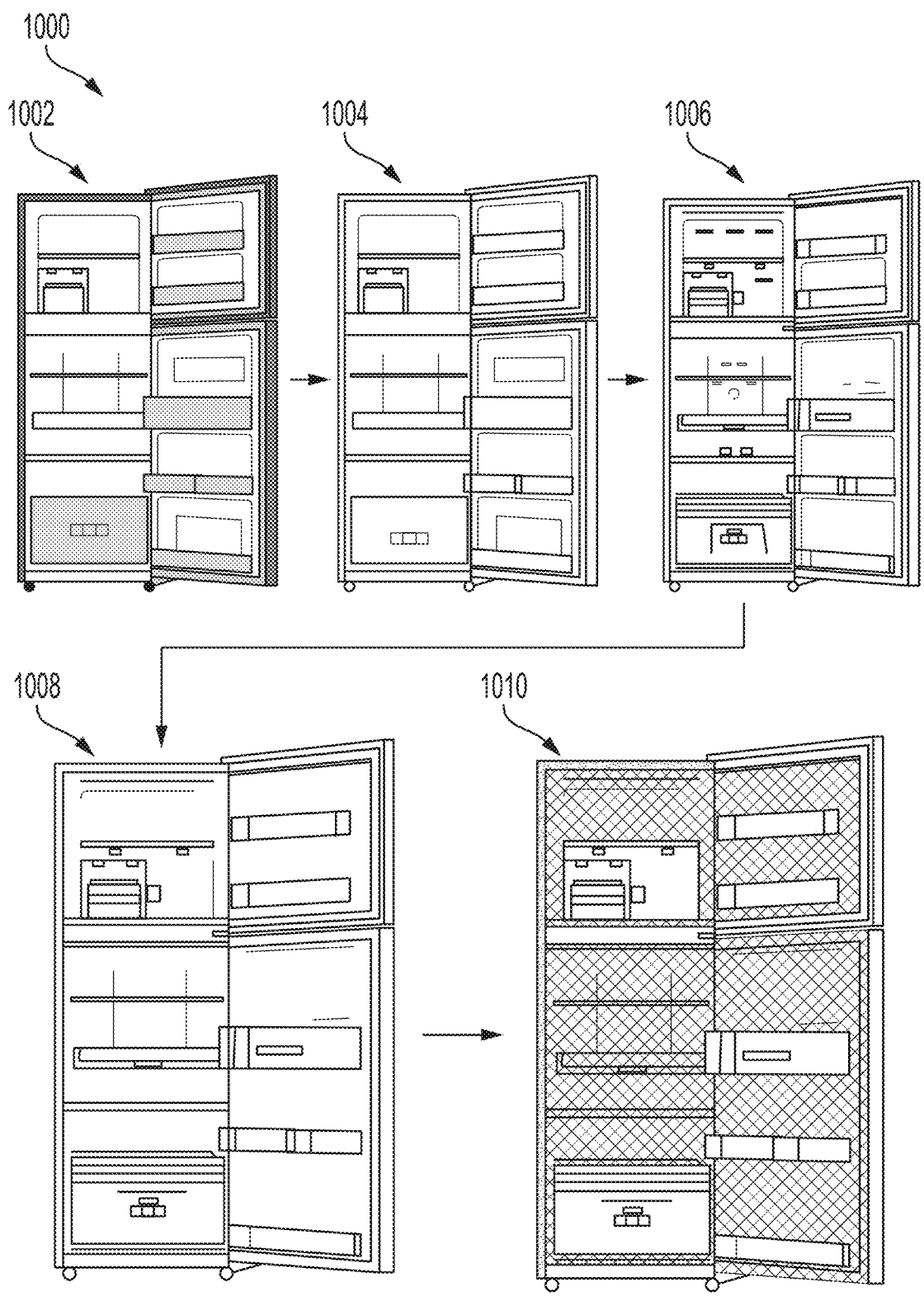
FIG. 10 depicts another example of receiving and automatically identifying sub-containers within an image of a container for the process of FIG. 2, according to certain embodiments of the present disclosure.

The following example is provided to illustrate another potential application of the operations described above. In particular, FIG. 10 depicts another example 1000 of receiving and automatically identifying sub-containers within an image of a container for the process of FIG. 2, according to certain embodiments of the present disclosure. Substantially similar to the techniques described with respect to FIGS. 3-9, an image depicting an open-doored refrigerator is received, identified, and binarized according to certain aspects of embodiments discussed herein.

In the example depicted in FIG. 10, similar to block 202 of process 200, and similar to the open-doored armoire shown in FIG. 3, the imaging system 124 receives and identifies an image 1002 of the open-doored refrigerator from image database 102 or a client device 128. As discussed above, and similar to block 204 of process 200, the noise filter module 106 de-noises the first image 1002 of the open-doored refrigerator in a substantially similar manner. In this example, the noise filter module 106 receives the first image 1002 and determines a grayscale image 1004 of the identified container (e.g., the first image 1002 of the open-doored refrigerator).

For instance, the noise filter module 106 applies a pixel threshold, according to any of the techniques discussed herein, to create a binarized image 1006. In additional or alternative embodiments, the noise filter module 106 can de-noise the binarized image 1006, creating filtered image 1008 of the open-doored refrigerator. In this example, the noise filter module 106 can determine shapes according to techniques discussed herein, determining quadrilaterals present in the open-doored refrigerator and identifying broken components of the filtered image 1008. The noise filter module 106 connects these broken components by adding black pixels to the filtered image, resulting in a sharpened image 1010.

Figure 11:
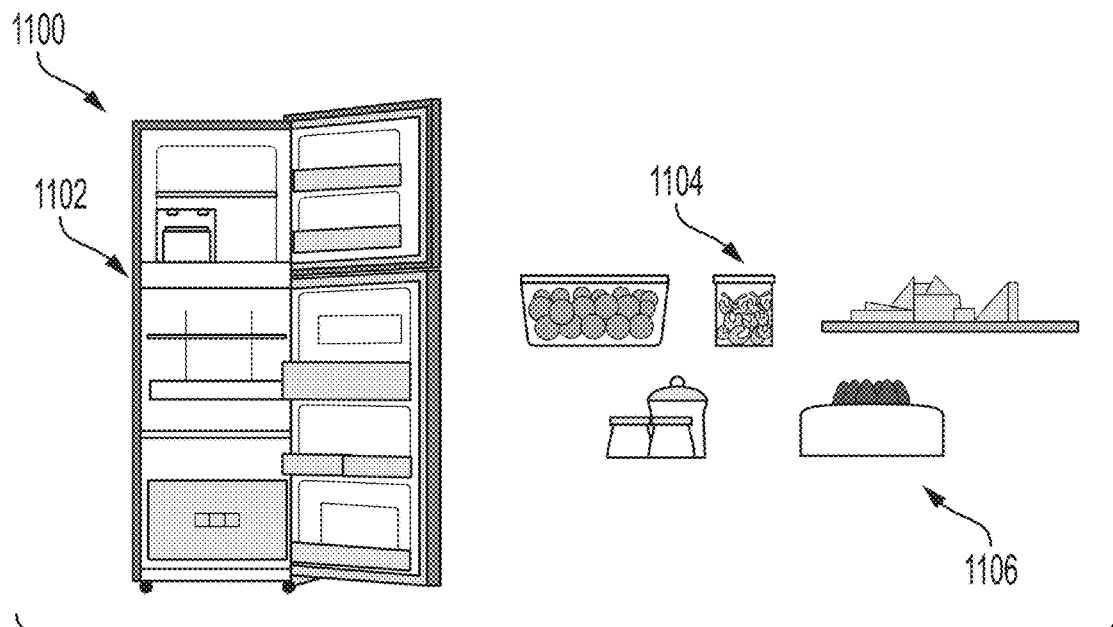
FIG. 11 depicts an example of receiving and automatically identifying sub-containers within an image of a container, and automatically selecting virtual objects that are semantically related to each of the sub-containers for the process of FIG. 2, according to certain embodiments of the present disclosure.

FIG. 11 depicts an example 1100 of automatically selecting virtual objects that are semantically related to each of the sub-containers for the process of FIG. 2, according to certain embodiments of the present disclosure. Substantially similar to blocks 202 and 204 of process 200, and similar to the techniques described with respect to FIGS. 3-10, an image depicting an open-doored refrigerator is received, identified, and binarized according to certain aspects of embodiments discussed herein. And in the example 1100, the object analysis module 118 selects virtual objects that are semantically related to sub-containers within the open-doored refrigerator, similar to block 206 of process 200.

In the example 1100 depicted in FIG. 11, substantially similar to the first image 1002 of the open-doored refrigerator shown in FIG. 10, the imaging system 124 receives and identifies a first image 1102 of the open-doored refrigerator from an image database 102 or a client device 128. As discussed above, with respect to block 204 of process 200, the noise filter module can 106 de-noises the first image 1002, determine a grayscale image, apply a pixel threshold to create a binarized image, de-noise the binarized image to create a filtered image, and connect broken components to form a sharpened image 1010, according to any of the techniques discussed herein. However, in this example, the object analysis module 118 selects virtual objects that are semantically related to sub-containers within the first image 1002 of the identified container (e.g., the first image 1102 of the open-doored refrigerator).

In example 1100, similar to block 206 of process 200, an object analysis module 118 can utilize metadata, e.g., a creator, brand name, image title, one or more captions, keywords, technical details, or any metadata discussed herein, to select objects from virtual object database 116 to fill the first image 1102 of the open-doored refrigerator. In additional or alternative embodiments, the object analysis module 118 can utilize semantic information received from a semantics tool 112 to select objects from a virtual object database 116 to fill the first image 1102 of the open-doored refrigerator.

As discussed above, the object analysis module 118 can determine three-dimensional shapes and relative sizes of one or more virtual objects that can be employed to fill one or more sub-containers within the container. The object analysis module 118 selects various foods, e.g., candidate virtual objects 1104, from the virtual object database 116 based on metadata or semantics associated with the first image 1102 of the open-doored refrigerator. Further, the object analysis module 118 can determine a group of foods—e.g., candidate virtual objects 1104—to fill one or more sub-containers within the first image 1102 of the open-doored refrigerator.

In some examples, virtual objects contained in virtual object database 116 can be based on real images previously retrieved from image database 102. In other examples, virtual objects contained in virtual object database 116 can be categorically sorted and retrieved in a group, bulk, batch, etc., thereby creating groupings according to one or more semantic categories. Further, in some examples, the shapes, relative dimensions, and textures associated with virtual objects contained in virtual object database 116 can be determined to any technique discussed herein. In one example, the object analysis module 118 can determine the texture of a 3D virtual object. For instance, the object analysis module 118 performs a textural analysis of a candidate virtual object 1106, determining a set of metrics associated with a perceived texture of the candidate virtual object 1106. In some examples, a textural analysis of the candidate virtual object 1106 can also provide information related to the colors and their associated intensities.

In this example, the object analysis module 118 employs a co-occurrence matrix to identify numerical values associated with the texture of the candidate virtual object 1106. In some examples, such numerical values can be used to represent, compare, or classify one or more textures associated with a candidate virtual object. For instance, using a subset of standard features, pre-determined based on a normalized co-occurrence matrix, an entry in a grayscale spatial dependence matrix can be calculated using the following expressions.

Angular $2^{nd}$ Moments=$\Sigma_i \Sigma_j p[i,j]^2$

Contrast=$\Sigma_{i=1}^{N_g} \Sigma_{j=1}^{N_g} n^2 p[i,j]$, where $|i-j|=n$ $$\text{Correlation} = \frac{\sum_{i=1}^{N_g} \sum_{j=1}^{N_g} (ij)p[i,j] - \mu_x \mu_y}{\sigma_x \sigma_y}$$

Entropy=$-\Sigma_i \Sigma_j p[i,j] \ln(p[i,j])$

Here, the term p represents a pixel value in a p×p co-occurrence matrix for a grayscale image, the term p[i,j] represents a value of the co-occurrence matrix based on a number of times an i and j pixel value occurs in an image, and the term $N_g$ represents the number of distinct gray-levels within the gray scale image.

Figure 12:
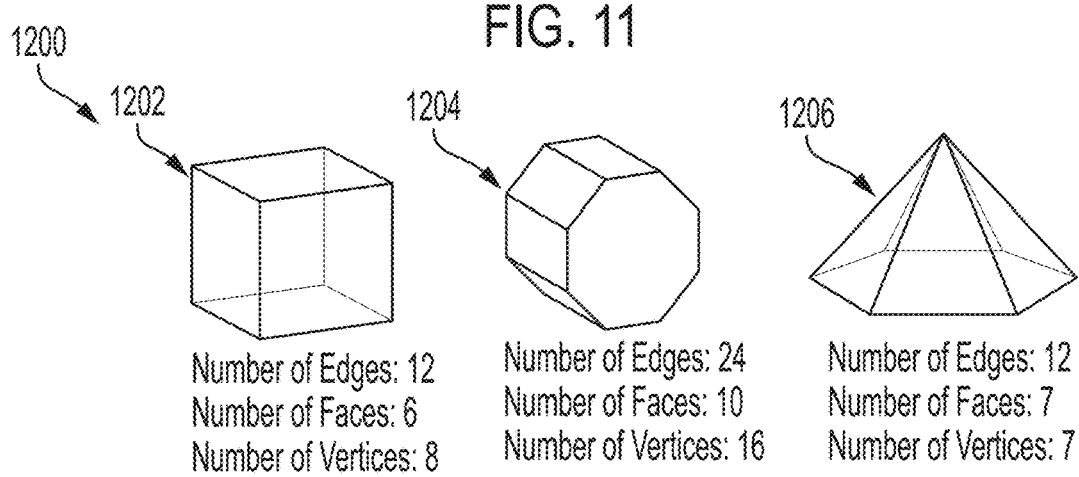
FIG. 12 depicts another example of automatically selecting virtual objects that are semantically related to each of the sub-containers for the process of FIG. 2, according to certain embodiments of the present disclosure.

FIG. 12 depicts another example 1200 of automatically selecting virtual objects that are semantically related to each of the sub-containers for the process of FIG. 2, according to certain embodiments of the present disclosure. In example 1200, the object analysis module 118 uses shape analysis to select 3D shapes of candidate virtual objects according to certain aspects of embodiments discussed herein, similar to block 206 of process 200.

In the example 1200 depicted in FIG. 12, the object analysis module 118 can determine the shape of one or more 3D virtual objects. For instance, the object analysis module 118 performs a shape analysis of one or more virtual objects, e.g., candidate virtual objects 1104 from the virtual object database 116. In some examples, the object analysis module 118 determines the 3D shape of a virtual object employing CCA techniques similar to the identification of blobs discussed above, with respect to FIGS. 4-6.

In this example, however, the shape analysis is performed using a triangulation algorithm. Identifying blobs, as discussed above, enables the (re-)construction of 3D objects based on connected components by applying geometric principles to vertices identified according to their connected edges. In contrast, the triangulation algorithm performs shape analysis of a mesh, e.g., a collection of vertices, edges, and faces, of an existing 3D virtual object. The triangulation algorithm employs a normalized bounding box that encompasses the mesh, and the object analysis module 118 uses the triangulation algorithm to determine the number of edges, faces, and vertices associated with the mesh. Using the number of edges, faces, and vertices associated with the mesh, the object analysis module 118 can determine a total area associated with the virtual object.

In some examples, the object analysis module 118 can determine the number of edges, faces, and vertices associated with the mesh prior to performing the textural analysis described above, with respect to FIG. 11. In other examples, the object analysis module 118 can determine that shape analysis should be performed and can bypass performing the textural analysis described above, with respect to FIG. 11, or vice versa.

In additional or alternative embodiments, the object analysis module 118 can employ textual information to identify one or more virtual objects, e.g., candidate virtual objects 1104. For instance, the object analysis module 118 can use metadata or semantics, as discussed above, with respect to FIGS. 2, 3, 10, and 11, to classify one or more virtual objects. In some examples, a virtual object may be classified using textural analysis, shape analysis, textual information, or any combination of these. In another example, textual information related to a virtual object may not be available. In such an instance, one or more deep learning techniques can be employed to classify images depicting a virtual object by one or more artificial neural network, e.g., deep neural networks, recurrent neural networks, convolutional neural networks computer vision, image analysis, a combination of these, or any other suitable machine learning algorithm.

Figure 13:
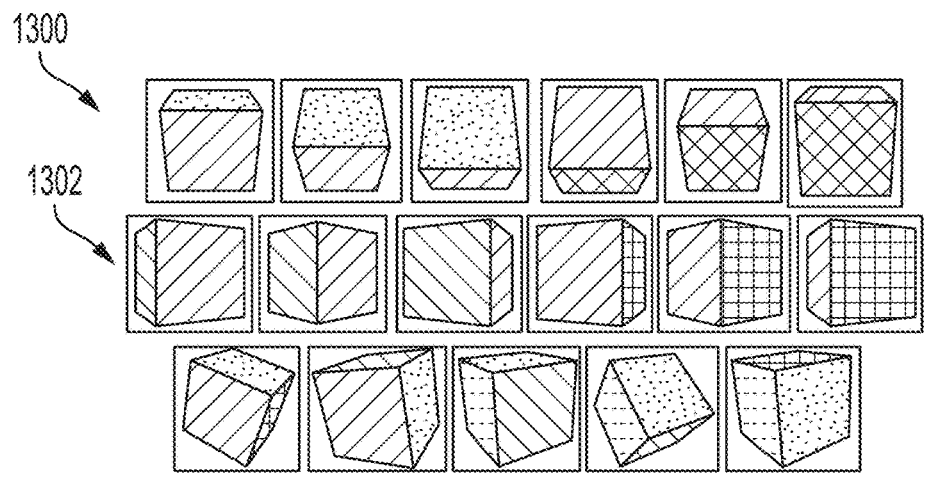
FIG. 13 depicts an example of automatically determining an arrangement of virtual objects within each sub-container based on semantics associated with each respective sub-container and their associated virtual objects for the process of FIG. 2, according to certain embodiments of the present disclosure.

FIG. 13 depicts an example 1300 of automatically determining an arrangement of virtual objects within each sub-container based on semantics associated with each respective sub-container and their associated virtual objects for the process of FIG. 2, according to certain embodiments of the present disclosure. In the example 1300, the position analysis module 120 determines an arrangement of virtual objects that are semantically related to sub-containers within a container, similar to block 206 of process 200.

In this example 1300, a substantially cubic sub-container 1302 is depicted from multiple viewing angles. In some examples, the substantially cubic sub-container 1302 is determined according to techniques similar to the determinations made above by the 3D imaging module 110, defining dimensions for the substantially cubic sub-container depicted in an image 906 shown in FIG. 9. For instance, the position analysis module 120 can determine the relative placement of one or more virtual objects within an identified sub-container according to the techniques discussed herein. Specifically, the position analysis module 120 can determine a total number of virtual objects that can fit within one or more sub-containers within an image. Using the relative size of one or more of the virtual objects the position analysis module 120 can determine the total number of virtual objects to be placed within a single sub-container. In additional or alternative embodiments, the position analysis module 120 can determine an optimal configuration of more than one virtual objects based on an associated axis of rotation. Further, in some examples, the virtual objects can be rotated by the position analysis module 120 according to the horizontal or vertical axes described above, with respect to FIGS. 7-9. In other examples, the virtual objects can be rotated about a depth axis by the position analysis module 120.

Figure 14:
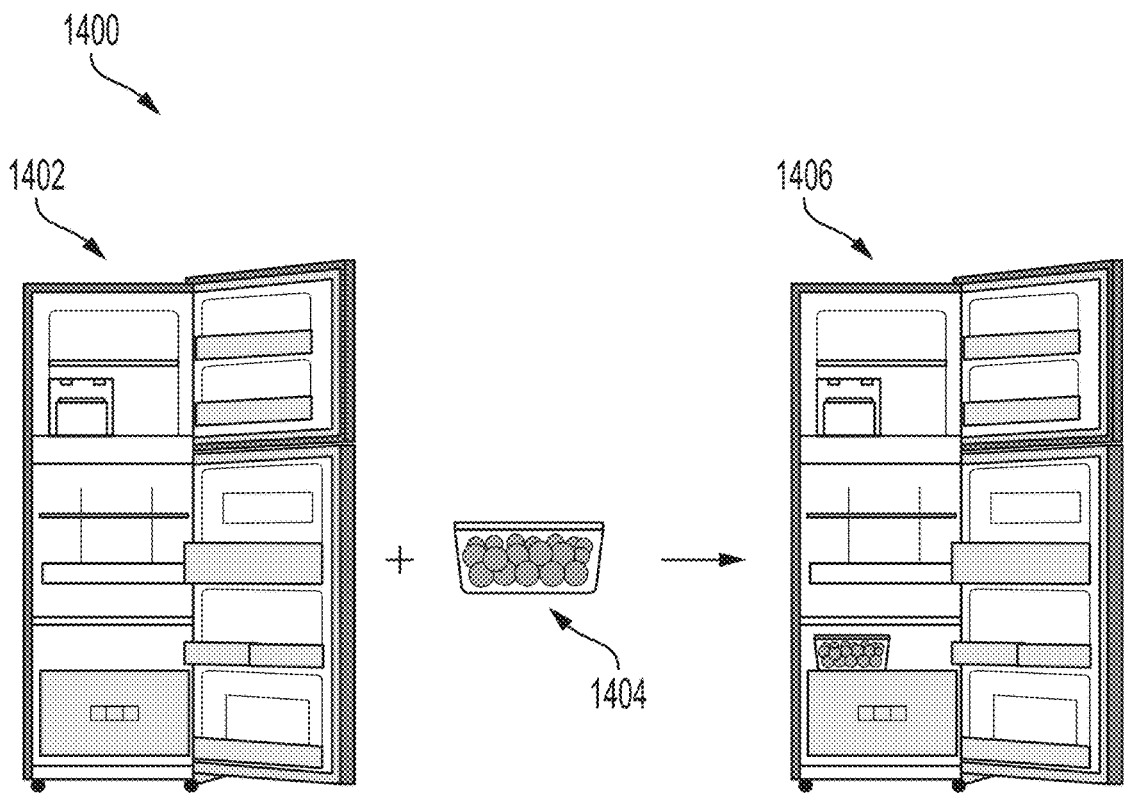
FIG. 14 depicts another example of automatically determining and generating an arrangement of virtual objects within each sub-container based on semantics associated with each respective sub-container and their associated virtual objects for the process of FIG. 2, according to certain embodiments of the present disclosure.

FIG. 14 depicts another example 1400 of automatically determining and generating an arrangement of virtual objects within each sub-container based on semantics associated with each respective sub-container and their associated virtual objects for the process of FIG. 2, according to certain embodiments of the present disclosure. In the example 1400, the semantics pairing module 122 identifies and places a virtual object that is semantically related to a sub-container within the open-doored refrigerator, similar to block 206 of process 200.

In this example, a semantics pairing module 122 uses data from the object analysis module 118 discussed above to determine a similar or semantically matching object 1404. Specifically, in this example, the semantics pairing module 122 employs shape and textural data, discussed with respect to FIGS. 11-13, to determine correlations between matching object 1404 and a sub-container of an open-doored refrigerator 1402.

For instance, the semantics pairing module 122 can determine that a shape of matching object 1404 correlates to a shape of a sub-container, e.g., a shelf within the refrigerator 1402, based on the two respective shapes sharing a similar number of edges, faces, vertices, a similar total area, or any combination of these. In additional or alternative embodiments, the semantics pairing module 122 can determine a texture or textual information of a matching object 1404 correlates to a texture or textual information of a sub-container shelf within the refrigerator 1402, based on the two respective shapes sharing. And, in this example, the semantics pairing module 122 can automatically place the correlated object in the corresponding sub-container shelf, represented by the modified refrigerator 1406.

Figure 15:
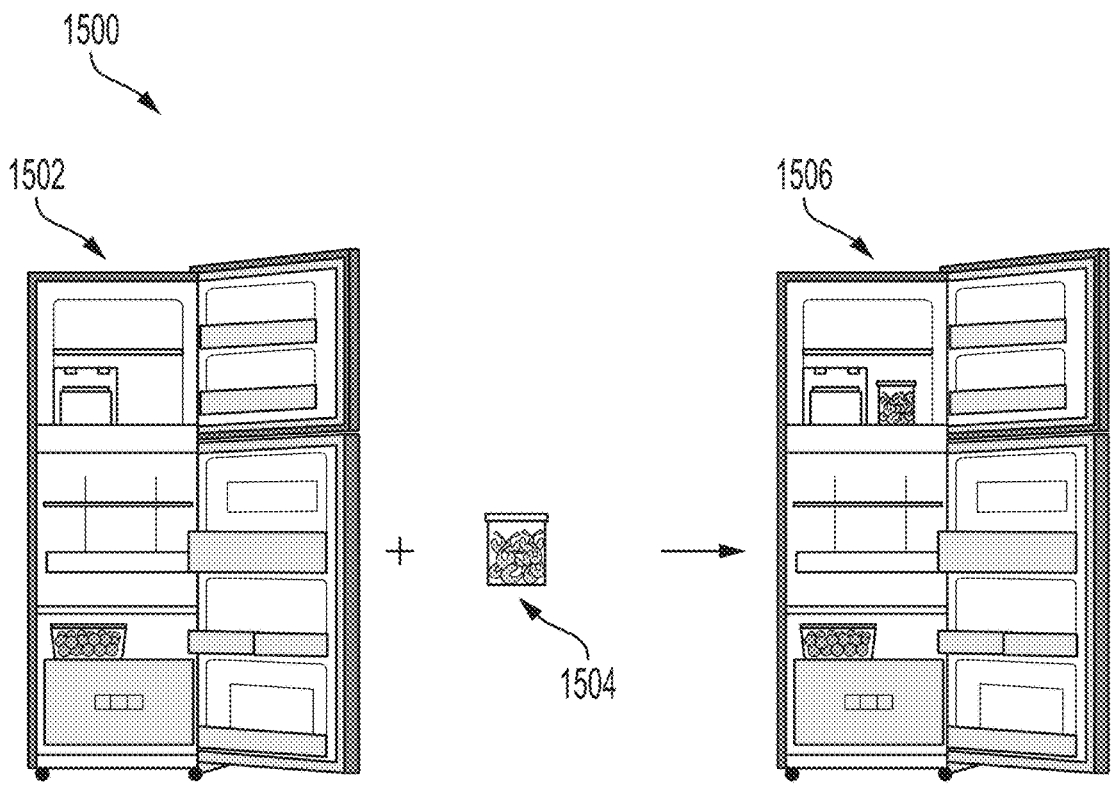
FIG. 15 depicts another example of automatically determining and generating an arrangement of virtual objects within each sub-container based on semantics associated with each respective sub-container and their associated virtual objects for the process of FIG. 2, according to certain embodiments of the present disclosure.

FIG. 15 depicts another example 1500 of automatically determining and generating an arrangement of virtual objects within each sub-container based on semantics associated with each respective sub-container and their associated virtual objects for the process of FIG. 2, according to certain embodiments of the present disclosure. In example 1500, the semantics pairing module 122 identifies virtual objects that are semantically related to sub-containers within the open-doored refrigerator, similar to block 206 of process 200.

In this example, a semantics pairing module 122 uses data from the object analysis module 118 discussed above to determine a similar or semantically matching object 1504. In this example, the semantics pairing module 122 employs shape and textural data, similar to the shape and textural data discussed with respect to FIGS. 11-14, to determine correlations between matching object 1504 and a sub-container of an open-doored refrigerator 1502. In this example, however, the semantics pairing module 122 determines the matching object 1504 is more closely related to a different sub-container than the sub-container paired with matching object 1404 shown in FIG. 14. Using the shape of the matching object 1504, the semantics pairing module 122 determines a higher shelf would be a closer semantic match for 1504 depicted in the image of open-doored refrigerator 1506.

Figure 16:
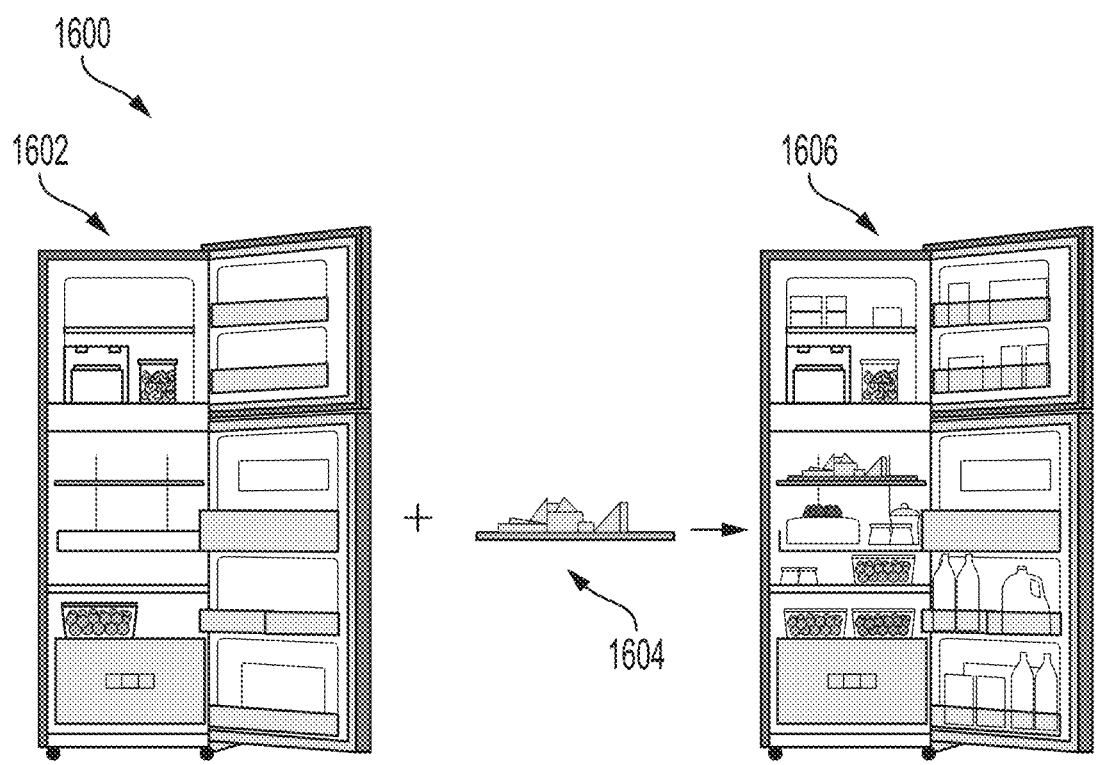
FIG. 16 depicts another example of automatically determining and generating an arrangement of virtual objects within each sub-container based on semantics associated with each respective sub-container and their associated virtual objects for the process of FIG. 2, according to certain embodiments of the present disclosure.

FIG. 16 depicts another example 1600 of automatically determining and generating an arrangement of virtual objects within each sub-container based on semantics associated with each respective sub-container and their associated virtual objects for the process of FIG. 2, according to certain embodiments of the present disclosure. In example 1600, the semantics pairing module 122 identifies virtual objects that are semantically related to sub-containers within the open-doored refrigerator, similar to block 206 of process 200.

In this example, a semantics pairing module 122 uses data from the object analysis module 118 discussed above to determine a similar or semantically matching object 1604. In this example, the semantics pairing module 122 employs shape and textural data, similar to the shape and textural data discussed with respect to FIGS. 11-15, to determine correlations between matching object 1604 and a sub-container of an open-doored refrigerator 1602. In this example, however, the semantics pairing module 122 determines the matching object 1604 based solely on the only available sub-container with a matching relative size. Using the size of the matching object 1604, the semantics pairing module 122 places the matching object 1504 on a middle-shelf sub-container of a depicted refrigerator 1606.

Figure 17:
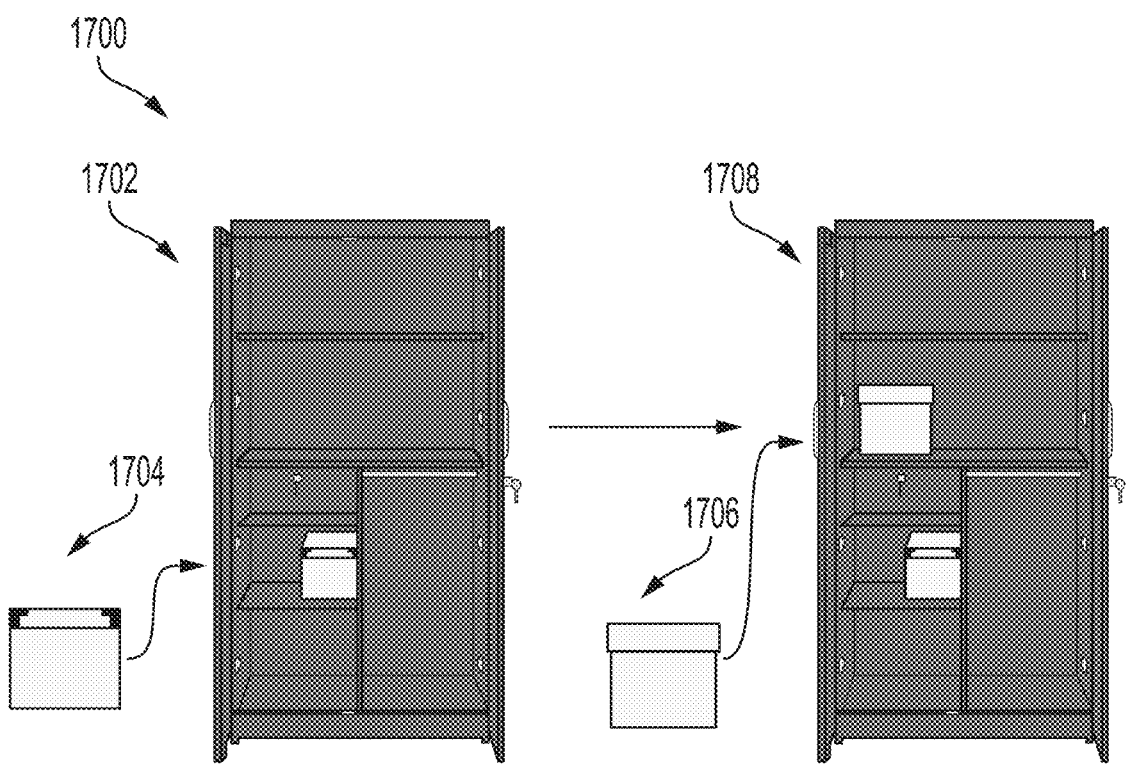
FIG. 17 depicts another example of automatically determining and generating an arrangement of virtual objects within each sub-container based on semantics associated with each respective sub-container and their associated virtual objects for the process of FIG. 2, according to certain embodiments of the present disclosure.

FIG. 17 depicts another example 1700 of automatically determining and generating an arrangement of virtual objects within each sub-container based on semantics associated with each respective sub-container and their associated virtual objects for the process of FIG. 2, according to certain embodiments of the present disclosure. In example 1700, the virtual object 1704 is placed in container 1702 at a rotated angle according to certain embodiments discussed herein. Further, in this example, a second virtual object 1706 is placed in container 1708 with a reduced angle of rotation, in order to create a more natural look based on an orientation of the identified planar surface of the sub-container shelf of armoire 1708.

Figure 18:
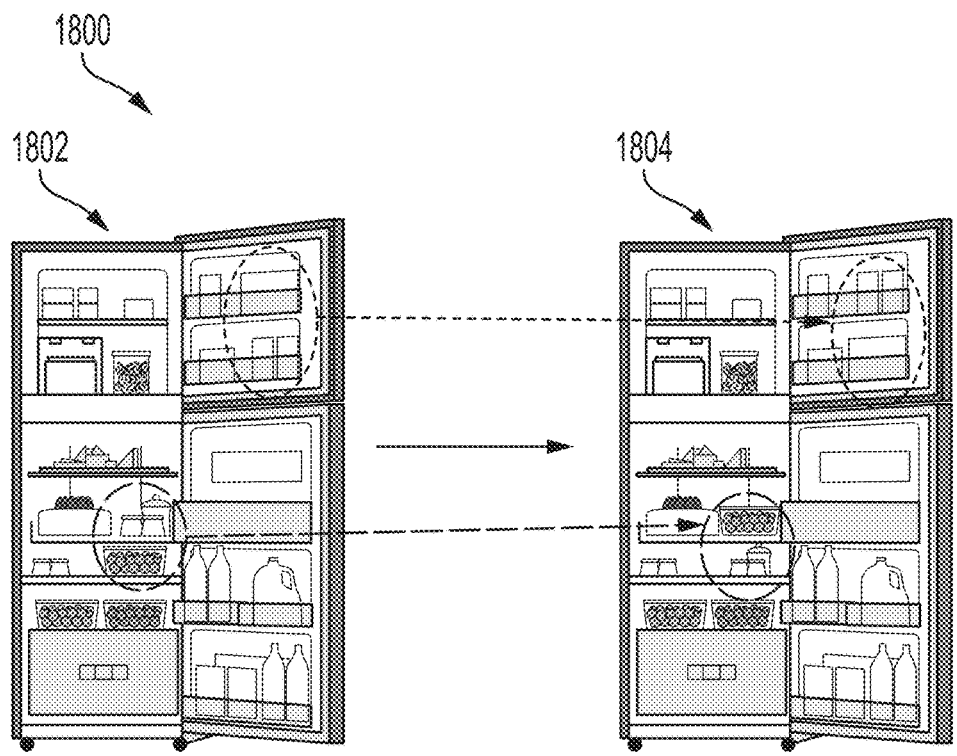
FIG. 18 depicts another example of automatically determining and generating an arrangement of virtual objects within each sub-container based on semantics associated with each respective sub-container and their associated virtual objects for the process of FIG. 2, according to certain embodiments of the present disclosure.

FIG. 18 depicts another example 1800 of automatically determining and generating an arrangement of virtual objects within each sub-container based on semantics associated with each respective sub-container and their associated virtual objects for the process of FIG. 2, according to certain embodiments of the present disclosure. In example 1800, similar to block 208 of the process 200, the semantics pairing module 122 is enabled to locate related virtual objects within the refrigerator 1802 to create closer semantic matches between virtual objects displayed in the rearranged refrigerator 1804. For instance, the relative location of closed jars and a bowl of oranges are swapped, in order to create a better semantic match between cylindrical shapes on a sub-container shelf of the rearranged refrigerator 1804. Similarly, cylindrically shaped jars in a sub-container door shelf of refrigerator 1802 are swapped for the substantially cubic shaped popcorn in the rearranged refrigerator 1804. The semantics pairing module 122 can place similar virtual objects adjacent to semantically related virtual objects according to any of the techniques described herein.

Figure 19:
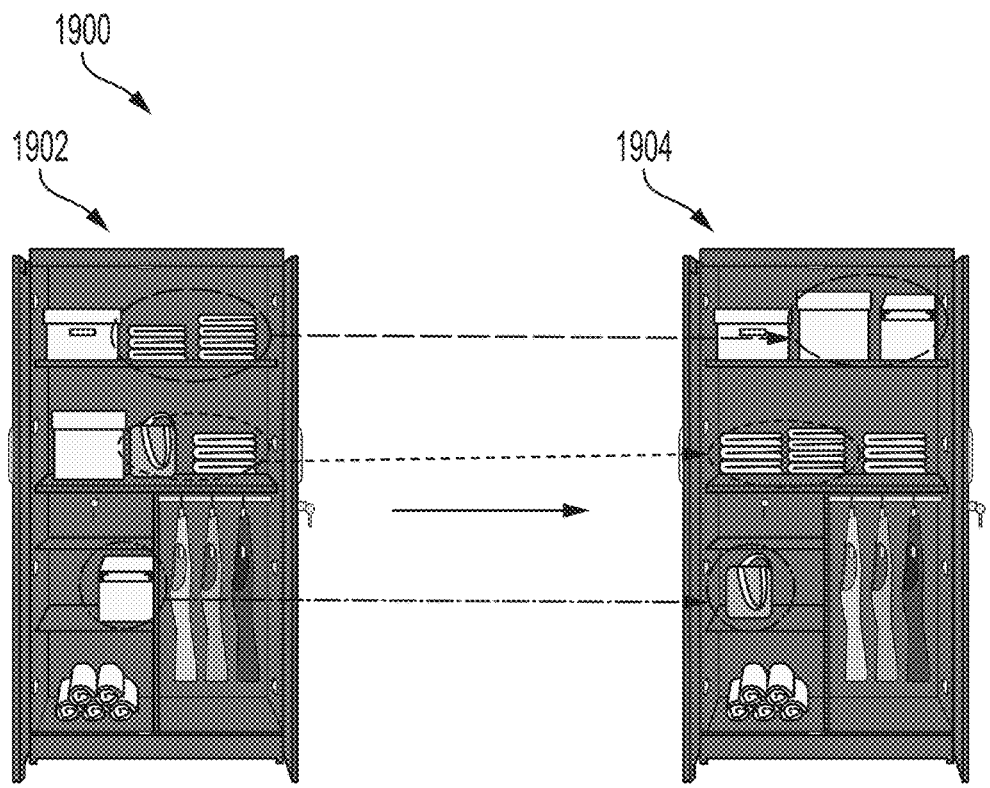
FIG. 19 depicts another example of automatically determining and generating an arrangement of virtual objects within each sub-container based on semantics associated with each respective sub-container and their associated virtual objects for the process of FIG. 2, according to certain embodiments of the present disclosure.

FIG. 19 depicts another example 1900 of automatically determining and generating an arrangement of virtual objects within each sub-container based on semantics associated with each respective sub-container and their associated virtual objects for the process of FIG. 2, according to certain embodiments of the present disclosure. In example 1900, similar to block 208 of the process 200, the semantics pairing module 122 relocates related virtual objects within the armoire 1902 to create closer semantic matches between virtual objects displayed in the rearranged armoire 1904. For instance, the relative position of the substantially cubic shaped item on the third shelf from the top within the armoire 1902 is relocated to the top shelf with other substantially cubic shaped items. In addition, the relative position of the linens on the top shelf and on the second shelf from the top within the armoire 1902 are relocated to the second shelf within the rearranged armoire 1904. And, in this example, a duffle bag having no semantic matches is placed on what would otherwise be an empty shelf in in the rearranged armoire 1904, in order to create a better semantic match between shapes, textures, and textual information related to the each of the virtual objects and their semantically related sub-container shelves of the rearranged armoire 1904. Similar to blocks 210 and 212 of the process 200, the image mixer 134 generates and outputs a second image, an arrangement of similar, semantically matching objects shown in the rearranged armoire 1904. The image mixer 134 generate and output the second image, having semantically-matched pairings of virtual objects and their respective sub-containers, according to any of the embodiments discussed here.

FIGS. 20-23 depict additional examples of automatically generating, for display, a second image depicting the virtual objects within the container for the process of FIG. 2, according to certain embodiments of the present disclosure. More specifically, FIGS. 20-23 depict additional examples of first and second images similar to the first image received in block 202 of process 200 and the second image output in block 212 of the process 200.

Figure 20:
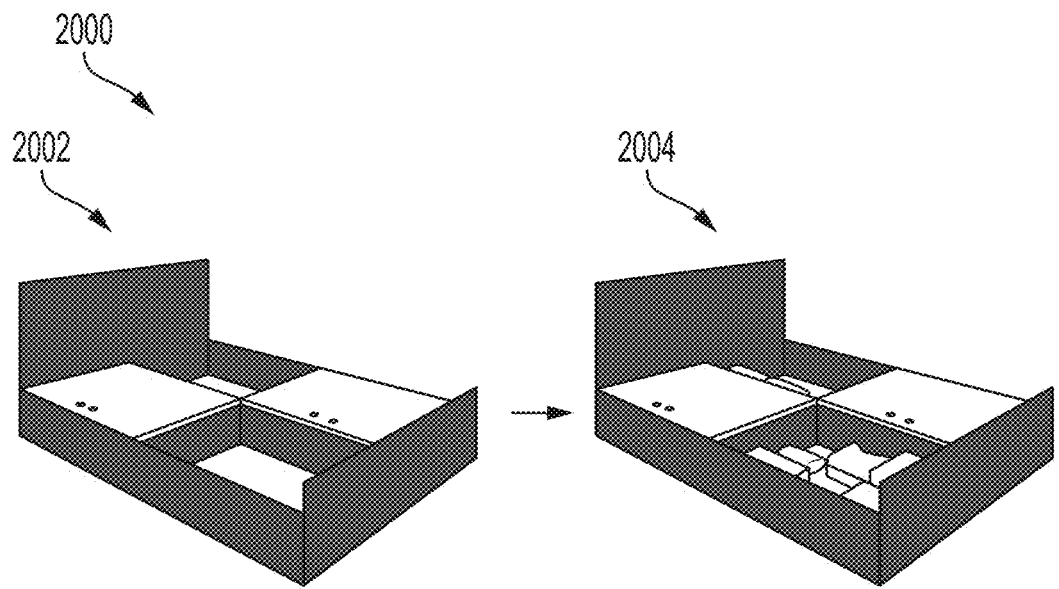
FIG. 20 depicts an example of automatically generating, for display, a second image depicting the virtual objects within the container for the process of FIG. 2, according to certain embodiments of the present disclosure.

In example 2000, shown in FIG. 20, a first image 2002 depicts a storage container of bedroom furniture having identifiable sub-containers. In the example 2000, the sub-container identification modules 130 can identify four sub-containers according to the techniques discussed above. And in this example 2000, the 3D imaging module 110 can determine that two of the four sub-containers are depicted as empty. Further, the virtual selection modules 132 described above are able to determine semantically-related virtual objects based on techniques discussed above. For instance, the object analysis module 118 can ascertain candidate virtual objects based on relative sizes and shapes, and respective positions of those identified candidate virtual objects, e.g., using the position analysis module 120 to determine a maximum number of visible linens that can be visually contained within parameters associated with the respective sizes of the visible linens and a calculated size of a three-dimensional cuboid or box associated with the corresponding, semantically-related sub-container. And, in some examples, the semantics pairing module 122 uses the semantic relationships between the candidate virtual objects to place similar objects together, e.g., placing sheets in one sub-container and towels in another, to generate a second image 2004.

Figure 21:
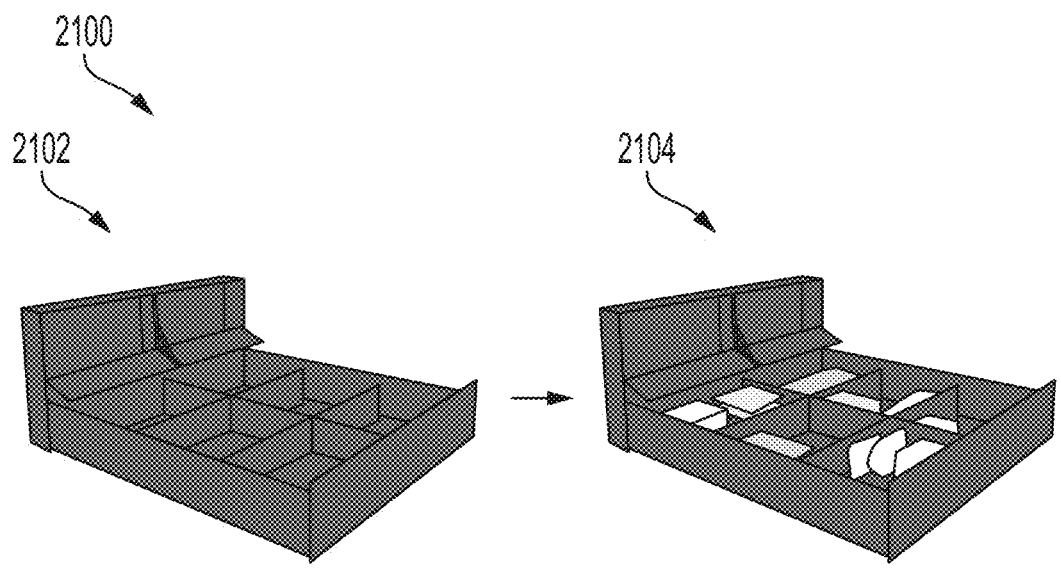
FIG. 21 depicts another example of automatically generating, for display, a second image depicting the virtual objects within the container for the process of FIG. 2, according to certain embodiments of the present disclosure.

Similarly, FIG. 21 shows an example 2100 having a first image 2102 that depicts bedroom furniture with eight empty sub-containers and a second image 2104 with virtual objects placed in every sub-container, including shelving on a headboard above the base of the bedroom furniture. It should be appreciated that the virtual objects need not completely fill a sub-container. In some instances, one or two virtual objects can be placed on a shelf, e.g., the headboard depicted in 2104. In such an instance, it may be advantageous to place fewer than the maximum available number of objects in a container (based on the respective sizes of categorically, semantically-related objects and a calculated size of a three-dimensional cuboid or box associated with the container), in order to avoid a cluttered, less aesthetically appealing appearance.

Figure 22:
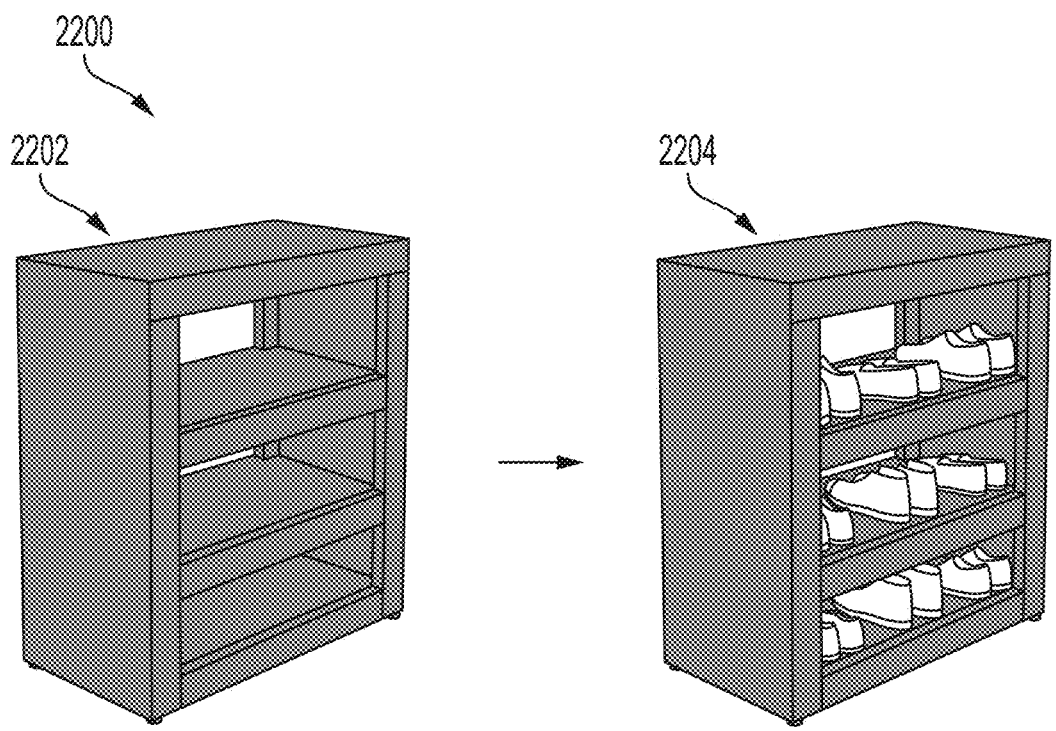
FIG. 22 depicts another example of automatically generating, for display, a second image depicting the virtual objects within the container for the process of FIG. 2, according to certain embodiments of the present disclosure.

Referring now to FIG. 22, another example 2200 is shown and is similar to the examples 2000 and 2100 discussed above. In example 2200, FIG. 22 depicts a shoe container in a first image 2202 and a second image 2204 having nine pairs of shoes. In some examples, the pairs of shoes shown in the second image 2204 can be related based on their relative shoe size, demographic information, e.g., gender or shoe type (e.g., athletic, dress, formal, casual, etc.), or color. However, in this example 2200, the shoes are placed at substantially similar depths and orientations, giving an aesthetic appearance of a substantially uniform row, while also providing substantially similar spacing between individual shoes of a pair and substantially similar spacing between the pairs of shoes. Further, the position analysis unit 120 can determine an optimal number of pairs per row, while also designating a slightly irregular amount of spacing between coupled pairs of shoes to give a more natural appearance.

Figure 23:
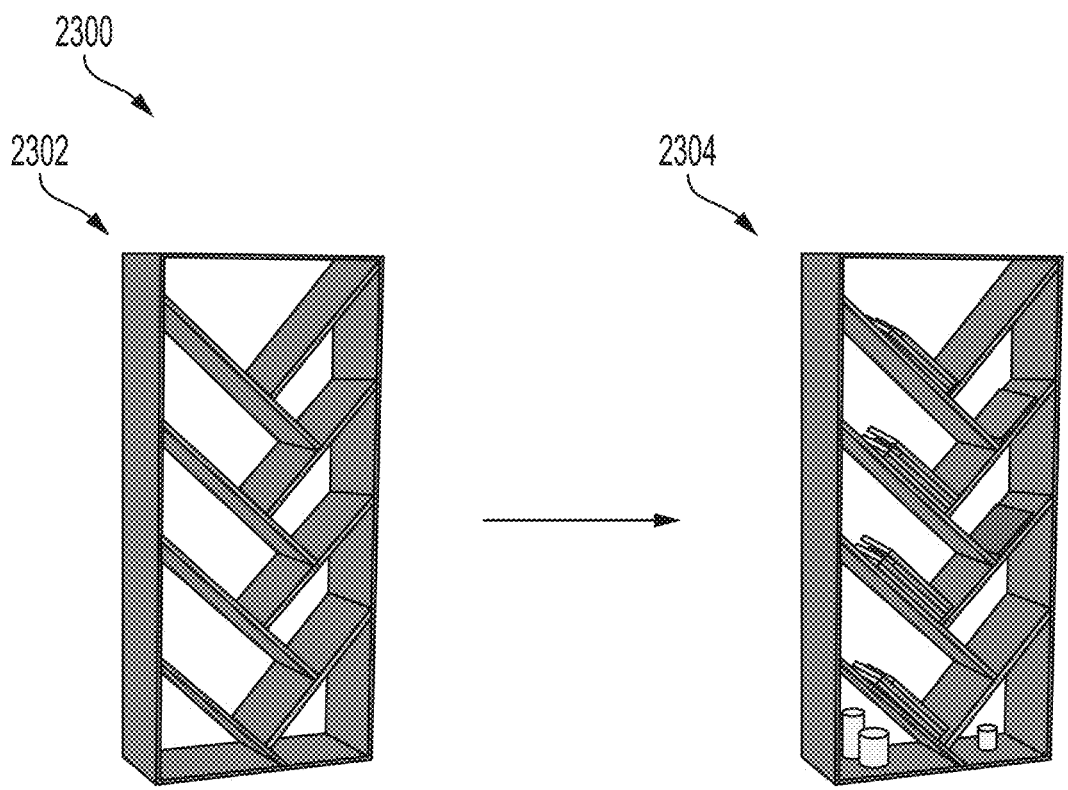
FIG. 23 depicts another example of automatically generating, for display, a second image depicting the virtual objects within the container for the process of FIG. 2, according to certain embodiments of the present disclosure.

In another example, shown in FIG. 23 and similar to the examples discussed above with respect to FIGS. 20-22, a first image 2302 and a second image 2304 of an angular bookshelf are depicted. In example 2300, the sub-container identification 130, and more specifically the spatial analysis modules 108 and 3D imaging module 110, can determine the depth of the substantially backless angular bookshelf using determined depths of the substantially leftward side, the base, and the sole horizontal joist depicted in the first image 2302 to determine relative depths and angles associated with the bookshelf. In this example, the virtual object selection modules 132 can determine a variety of colorful virtual books can be placed on the angular bookshelf based on its substantially neutral, warm, earth tones, enabling object analysis 118 to select a multitude of book having different hues to include within the shelving.

Further, in some examples, the semantics pairing module 122 can determine the relationships between those books, e.g., placing similarly colored books on the same or alternating shelving, associating books of a similar spine thickness, and associating shorter books with taller shelving or vice versa. In this example, the position analysis module 120 also accounts for gravitational effects, determining that the angles of the bookshelves dictate that the books should not be placed near the uppermost portion of a given shelf. Similarly, the position analysis module 120 can determine the rounded candles, selected by the object analysis module, and semantically paired by the semantics pairing module, should be located at the base of the bookshelf because their rounded appearance would be sub-optimal for an angular shelf given its potential unnatural appearance, e.g., appearing with a propensity to roll, fall, drop, or be otherwise unstable.

Figure 24:
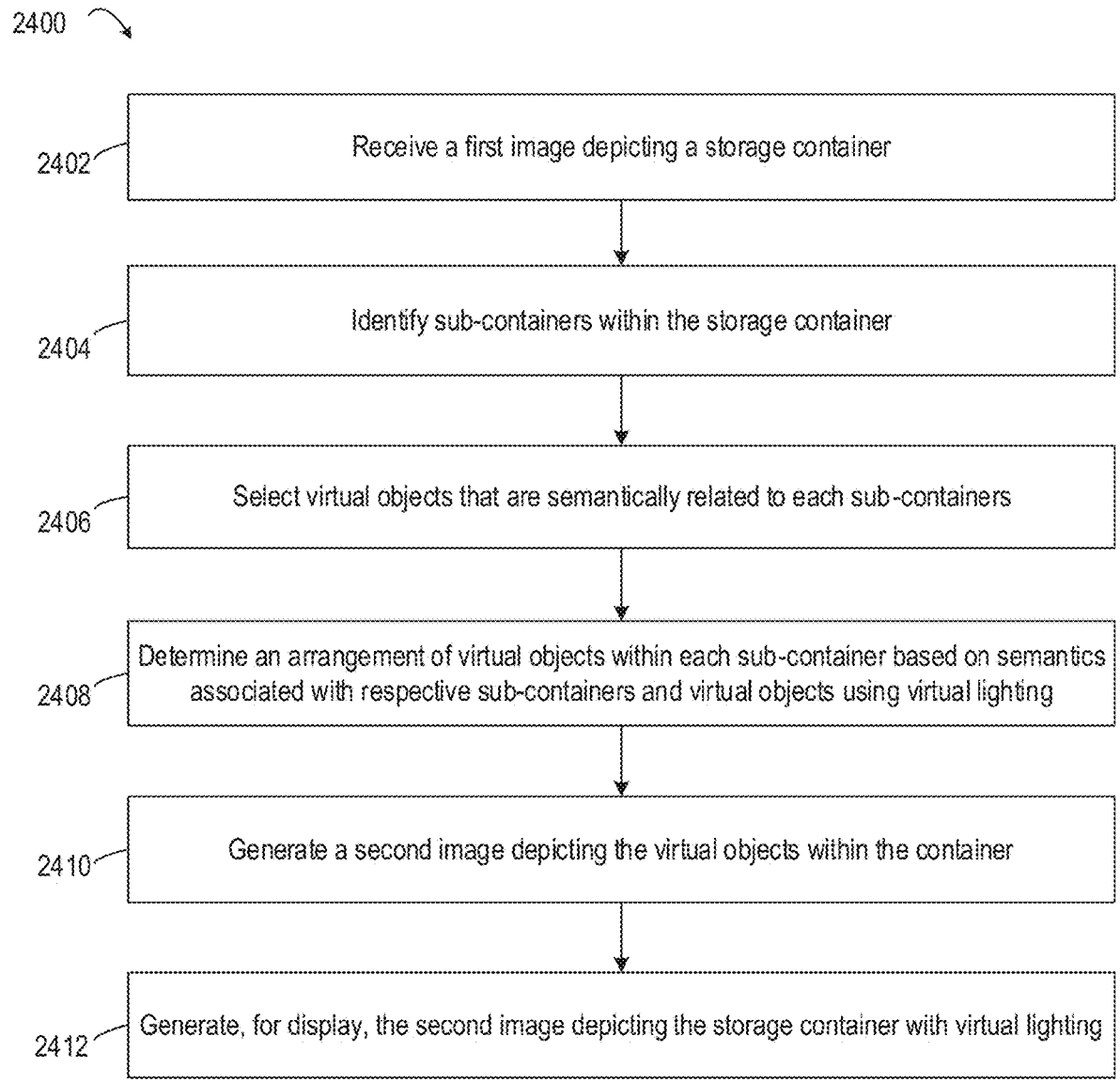
FIG. 24 depicts a process for visually augmenting images of three-dimensional containers with virtual lighting, according to certain embodiments of the present disclosure.

As described above, and similar to the process 200 illustrated in FIG. 2, the imaging system 124 executes one or more operations described herein to generate images that depict three-dimensional containers that store objects depicted using various virtual elements. For instance, FIG. 24 depicts a process 2400 for visually augmenting images of empty three-dimensional containers with virtual lighting, according to certain embodiments of the present disclosure. In some embodiments, one or more processing devices implement operations depicted in FIG. 24 by executing suitable program code (e.g., sub-container identification modules 130, virtual objection selection modules 132, etc.). For illustrative purposes, the process 2400 is described with reference to certain examples depicted in the figures. Other implementations, however, are possible.

At block 2402, the process 2400 involves receiving a first image depicting a storage container. Substantially similar to block 202 of the process 200 described above with respect to FIG. 2, the imaging system 124 receives the first image depicting a storage container from one or more client devices 128, an image database 102, or some combination thereof. Examples of received first images are also described in greater detail with respect to FIGS. 3, 10, 11, 29, and 30.

At block 2404, the process 2400 involves identifying sub-containers within the depicted storage container. Substantially similar to block 204 of the process 200 described above with respect to FIG. 2, the image processing system 104 employs sub-container identification modules 130 to identify information related to sub-containers within a container of a first image. Additional examples of identifying sub-containers within a storage container of a first image are described with respect to FIGS. 3-10.

At block 2406, the process 2400 involves selecting virtual objects that are semantically related to each of the respective sub-containers. Substantially similar to block 206 of the process 200 described above with respect to FIG. 2, the semantics pairing module 122 determines parameters for filling one or more sub-containers based on pairings of virtual objects and semantically-related sub-containers. Examples of selecting virtual objects that are semantically related to each of the sub-containers are described in detail with respect to FIGS. 11-12.

At block 2408, the process 2400 involves determining an arrangement of virtual objects within each sub-container based on semantics associated with respective sub-containers and virtual objects using virtual lighting. Similar to block 208 of the process 200 described above with respect to FIG. 2, the process 2400 involves determining an arrangement of virtual objects within each sub-container based on semantics associated with their respective sub-containers and virtual objects. However, in this example, the optional virtual lighting effects are applied to the first image by the virtual lighting module 126. Specifically, the virtual lighting module 126 adds lighting effects to virtual objects within a sub-container. After identifying, pairing, and arranging virtual objects in a sub-container, lighting or the absence thereof may result in a less desirable aesthetic. Augmenting the arranged virtual objects by adding lighting effects to the virtual objects and their sub-containers can increase a sense realism for the arrangement. The virtual lighting module 126 can determine an amount of ambient light (e.g., an average, mean, or median amount of global illumination) present in an image received from the image processing system 104. Using this amount of ambient light, or alternatively increasing or decreasing the ambient light, the virtual lighting module 126 can add a virtual lighting source to determine a vector of diffuse lighting (e.g., lighting that is perpendicularly reflective of a surface of a virtual object) and one or more vectors of specular lighting (e.g., a projected lighting angle based on a speculative viewing angle or range of angles) associated with one or more of the virtual objects or surfaces of one or more sub-containers.

At block 2410, the process 2400 involves generating a second image depicting the virtual objects within the depicted storage container. Substantially similar to block 210 of the process 200 described above with respect to FIG. 2, the process 2400 also involves generating the second image depicting the virtual objects within the container. However, in this example, the optional virtual lighting effects are applied to the first image by the virtual lighting module 126. Specifically, referring back to example of the virtual fruits discussed above, the virtual lighting module 126 can determine an ambient amount of light present in the first image of the refrigerator. The virtual lighting module 126 also identifies a light source contained within the refrigerator as a refrigerator light bulb. Using information from the 3D imaging module 110, the virtual lighting module can determine a diffuse lighting vector for each virtual apple and each virtual grape, as well as the fruit drawer sub-container. Similarly, the virtual lighting module 126 can determine one or more specular lighting vectors for the virtual apples, virtual grapes, and fruit drawer sub-container. Using the ambient lighting, diffuse lighting vectors, and specular lighting vectors, the virtual lighting module 126 creates a combined virtual lighting effect that can augment the arrangement of the virtual fruits in the fruit drawer sub-container.

At block 2412, the process 2400 involves generating, for display, the second image depicting the storage container with the virtual lighting. Similar to block 212 of the process 200 described above with respect to FIG. 2, the process 2400 also involves generating, for display, the second image depicting the virtual objects within the container. However, in this example, the optional virtual lighting effects are applied to the first image by the virtual lighting module 126. Specifically, in some examples, the virtual lighting module 126 can add virtual lighting effects for each respective virtual object in their respective sub-containers. In one example, the virtual lighting module 126 determines a lack of ambient light in an original image requires an increased amount of virtual ambient light to be added to the first image. In another example, the virtual lighting module 126 determines an adequate amount of light is present for an existing surface of one or more sub-containers, only adding virtual lighting effects to the surfaces of the virtual objects. In some examples, the virtual lighting module can add one of ambient, diffuse, specular virtual effects or any combination of these. And in some examples, the virtual lighting module 126 can employ information related to a surface of virtual object or sub-container (e.g., texture, reflectivity, color, shape, relative position or elevation, flatness, proximity to other objects or edges, contrast, etc.) to determine an amount of ambient, diffuse, specular virtual effects or any combination of these.

Figure 25:
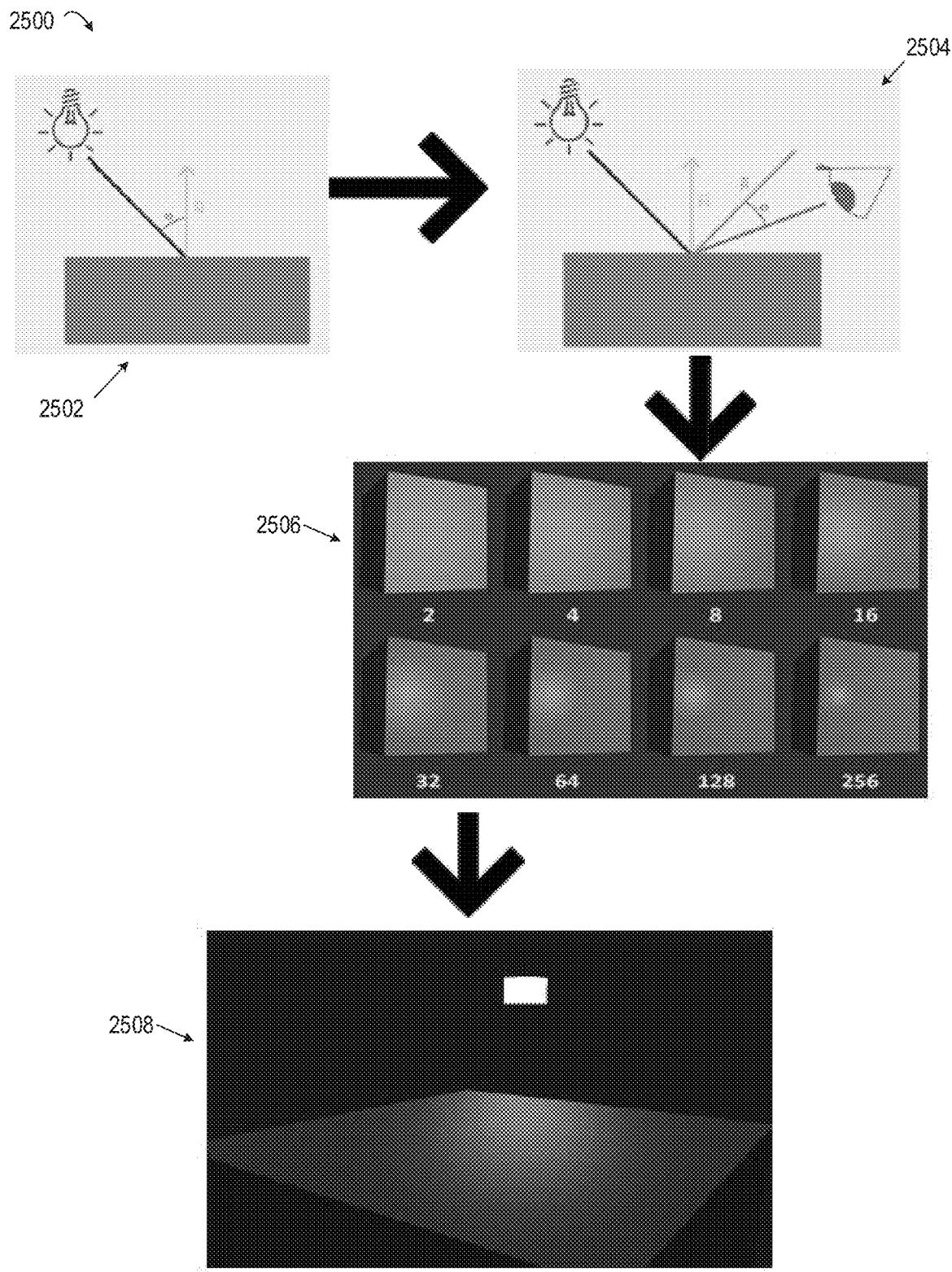
FIG. 25 depicts an example of automatically determining virtual lighting for three-dimensional objects for the process of FIG. 24, according to certain embodiments of the present disclosure.

FIG. 25 depicts an example 2500 of automatically determining virtual lighting for three-dimensional objects for the process of FIG. 24, according to certain embodiments of the present disclosure. In example 2500, similar to block 2408 of the process 2400, the semantics pairing module 122 is enabled to locate related virtual objects within a sub-container and optional virtual lighting effects are applied to a first image 2502 by the virtual lighting module 126 to increase visual appeal. For instance, realistic visualization of the first image with an arrangement of virtual objects can be augmented based on the physics of light as we understand it.

In example 2500, the virtual lighting module 126 determines an amount of ambient lighting (e.g., light that does not come from a single light source) present in the first image and optionally, adds additional global lighting to darker images. In example, 2500, the virtual lighting module 126 can determine an amount of diffuse lighting (e.g., light that is reflected from a surface) in image 2502 by adding a virtual lighting source such as the light bulb and producing light rays targeted at a surface of a sub-container or a virtual object. In some examples, the proximity of a light ray to a perpendicular orientation with respect to a surface can increase the visual impact of the lighting effect. And in some examples, vector analysis of projected light rays based on the relative locations of a lighting source and the projected surface can be employed to increase the effectiveness of the diffuse lighting shown in image 2502, based on the orientation of a surface with respect to the virtual lighting source.

In example 2500, the virtual lighting module 126 also determines an amount of specular lighting (e.g., light that is reflected from a surface at an angle that mirrors the angle of incident with the surface) based on the virtual lighting source above, using similar vector analysis at a surface of a sub-container or a virtual object. In some examples, the virtual lighting module 126 can determine a reflection vector by simulating a reflection of the light direction around a normal vector. Using the reflection simulation, the virtual lighting module 126 can determine an angular distance between the reflection vector and a projected viewing direction. In some examples, a substantially smaller angular distance between the reflection vector and the projected viewing direction can increase perceptible brightness of a surface with such a specular lighting effect, e.g., image 2504.

In some examples, the virtual lighting module 126 can determine a specular lighting intensity (e.g., the relative brightness of a surface based on the relative location of the surface and reflective properties associated with the surface) within a three-dimensional space. For instance, an image 2506 shows versions of a substantially cubic shaped object having ambient, diffuse, and specular lighting effects. In this example, the cuboid depicted in image 2506 can have varying amounts of specular lighting intensity. For instance, considering the cuboids 2, 4, 8, 16, 32, 64, 128, and 256 are all associated with a first amount of specular lighting, and each cuboid shows the effect of exponentially increasing the specular lighting intensity by the corresponding number value associate with each cuboid, e.g., 2, 4, 8, 16, 32, 64, 128, and 256. As the intensity of the specular lighting increases, the brightness and reflectivity of the light on the surface of the cuboid is increased.

In example 2500, the specular light effect, described above with respect to image 2504, can produce an unrealistic visual image based on varying specular lighting intensity. In some examples, the virtual lighting module 126 can constrain specular lighting intensity by setting exponential increase of the specular lighting to a predetermined value. For instance, using the exponential factor of 32 associated with cuboid 32 shown in image 2504, the virtual lighting module 126 can determine an appropriate amount of specular lighting to add to a determined amount of ambient and diffuse lighting. And in this example, using cuboid 32, the virtual lighting module 126 adds an appropriate amount of light to the flooring shown in an image 2508, given the relative distance between the floor and an added light source.

Figure 26:
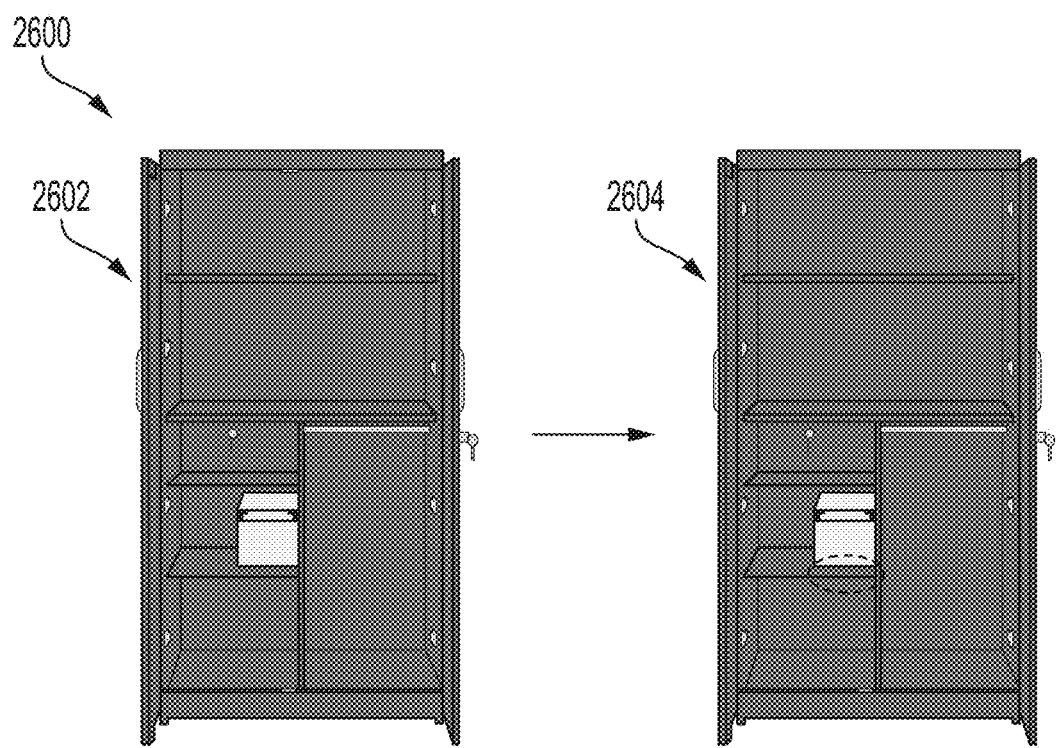
FIG. 26 depicts an example of visually augmenting images of three-dimensional containers with virtual lighting for three-dimensional objects for the process of FIG. 24, according to certain embodiments of the present disclosure.

FIG. 26 depicts an example 2600 of visually augmenting images of empty three-dimensional containers with virtual lighting for three-dimensional objects for the process of FIG. 26, according to certain embodiments of the present disclosure. In example 2500, similar to block 2408 of the process 2400, the semantics pairing module 122 is enabled to locate related virtual objects within a sub-container and optional virtual lighting effects are applied to a first image of an open-doored armoire by the virtual lighting module 126 to increase visual appeal.

In example 2600, a virtual object substantially similar to the virtual object 1704 shown in FIG. 17, is placed in a sub-container depicted in image 2604. However, in this example, the virtual lighting module 126 adds virtual lighting to the area contained within the dotted circle of the image 2604 to create a more natural look based on the identified planar surface of the sub-container shelf within the open-doored armoire.

Figure 27:
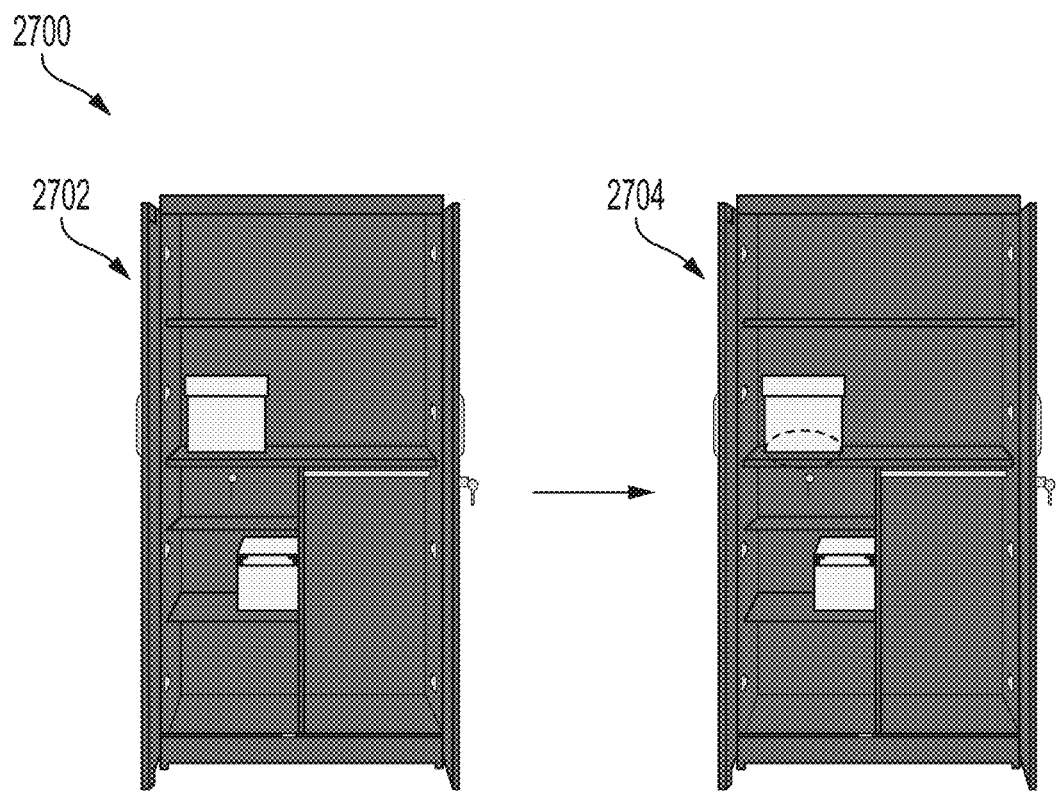
FIG. 27 depicts another example of visually augmenting images of three-dimensional containers with virtual lighting for three-dimensional objects for the process of FIG. 24, according to certain embodiments of the present disclosure.

FIG. 27 depicts another example 2700 of visually augmenting images of empty three-dimensional containers with virtual lighting for three-dimensional objects for the process of FIG. 26, according to certain embodiments of the present disclosure. In example 2700, similar to block 2408 of the process 2400, the semantics pairing module 122 is enabled to locate related virtual objects within a sub-container and optional virtual lighting effects are applied to a first image 2702 of an open-doored armoire by the virtual lighting module 126 to increase visual appeal.

In example 2700, a second virtual object substantially similar to the second virtual object 1706 shown in FIG. 17, is placed in a sub-container depicted in image 2704. However, in this example, the virtual lighting module 126, uses the reduced angle of rotation associated with the visually higher virtual object to add virtual lighting to area contained within the dotted circle of the second image 2704 accordingly. For instance, to create a more natural look based on the identified planar surface of the sub-container shelf within the open-doored armoire, the virtual lighting module 126 can consider the reduction in the angle of rotation associated with the corresponding shelf sub-container to reduce the total amount of virtual lighting effects applied to the surface of the shelf. And in some examples, the virtual lighting module 126 can reduce the specular lighting intensity based on such a determination to create the second image 2704.

Figure 28:
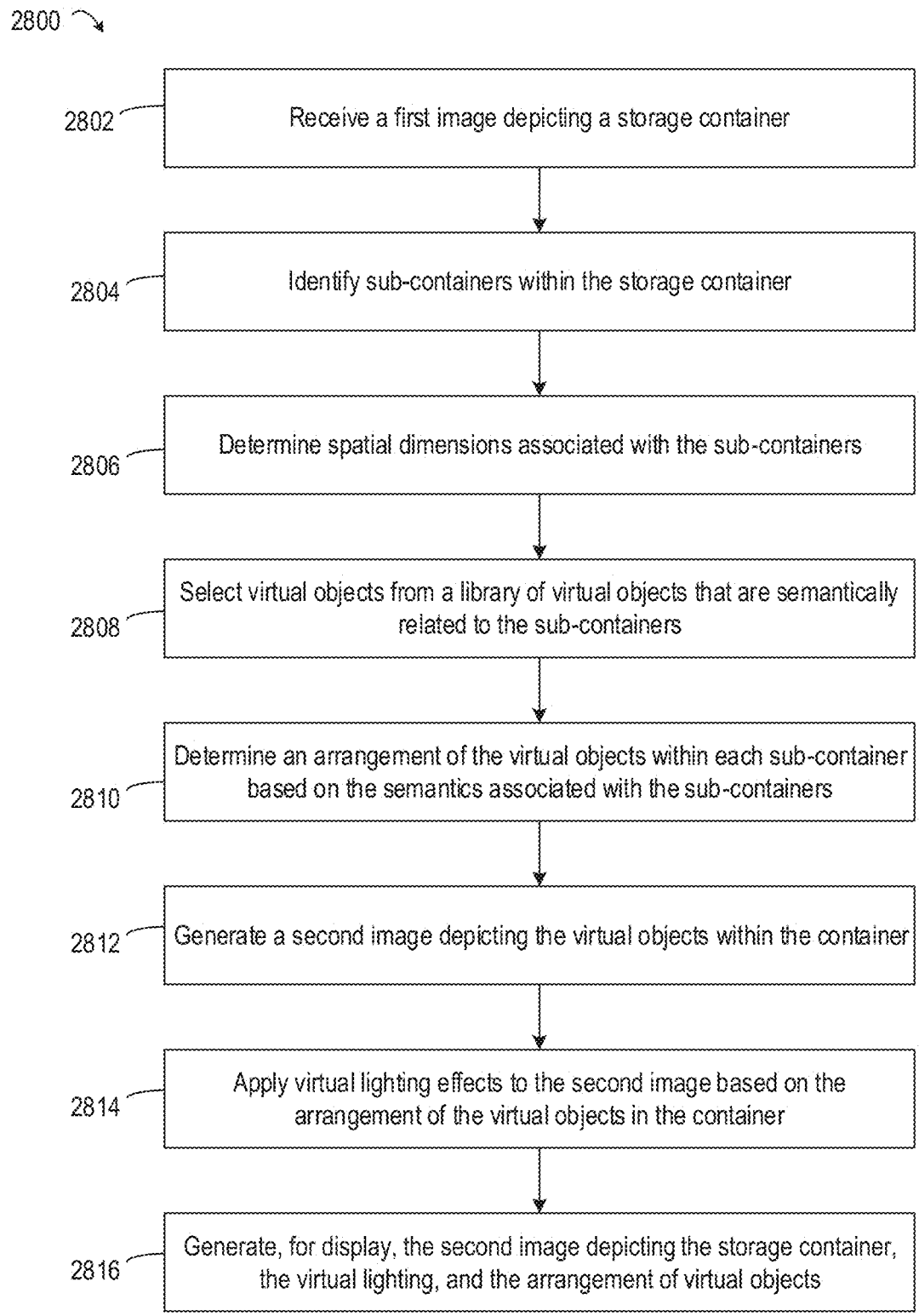
FIG. 28 depicts a process for visually augmenting images of three-dimensional containers with semantic arrangement of virtual objects and virtual lighting for three-dimensional objects, according to certain embodiments of the present disclosure.

As described above, and similar to the processes 200 and 2400 illustrated in FIGS. 2 and 24, respectively, the imaging system 124 executes one or more operations described herein to generate images that depict three-dimensional containers that store objects depicted using various virtual elements. For instance, FIG. 28 depicts a process 2800 for visually augmenting images of empty three-dimensional containers with semantic arrangement of virtual objects and virtual lighting for three-dimensional objects, according to certain embodiments of the present disclosure. In some embodiments, one or more processing devices implement operations depicted in FIG. 28 by executing suitable program code (e.g., sub-container identification modules 130, virtual objection selection modules 132, etc.). For illustrative purposes, the process 2800 is described with reference to certain examples depicted in the figures. Other implementations, however, are possible.

At block 2802, the process 2800 involves receiving a first image depicting a storage container. Substantially similar to blocks 202 and 2402 of the processes 200 and 2400 described above with respect to FIGS. 2 and 24, respectively, the imaging system 124 receives the first image depicting a storage container from one or more client devices 128, an image database 102, or some combination thereof. Examples of received first images are also described in greater detail with respect to FIGS. 3, 10, 11, 29, and 30.

At block 2804, the process 2800 involves identifying sub-containers within the storage container. Substantially similar to blocks 204 and 2404 of the processes 200 and 2400 described above with respect to FIGS. 2 and 24, respectively, the image processing system 104 employs sub-container identification modules 130 to identify information related to sub-containers within a container of a first image. Additional examples of identifying sub-containers within a storage container of a first image are described with respect to FIGS. 3-10.

At block 2806, the process 2800 involves determining spatial dimensions associated with the sub-containers. As discussed above, and similar to blocks 204 and 2404 of processes 200 and 2400, respectively, the 3D imaging module 110 of image processing system 104 identifies sub-containers within an image, based on a geospatial image. The 3D imaging module 110 can identify dimensions associated with connected components, defining horizontal and vertical planes in an image according to techniques described herein.

In some examples, the 3D imaging module 110 can determine the depth of a sub-container depicted in an image by employing one or more angles and their related Euclidian distance between adjacent points. In some examples, the 3D imaging module 110 can repeat such determinations, defining dimensions for each sub-container depicted in an image.

At block 2808, the process 2800 involves selecting virtual objects that are semantically related to each of the sub-containers. Substantially similar to blocks 206 and 2406 of the processes 200 and 2406 described above with respect to FIGS. 2 and 24, respectively, the semantics pairing module 122 determines parameters for filling one or more sub-containers based on pairings of virtual objects and semantically-related sub-containers. Examples of selecting virtual objects that are semantically related to each of the sub-containers are described in detail with respect to FIGS. 11-12.

At block 2810, the process 2800 involves determining an arrangement of the virtual objects within each respective sub-container based on the semantics associated with each of the respective sub-containers. Similar to blocks 208 and 2408 of the processes 200 and 2408 described above with respect to FIGS. 2 and 24, respectively, the process 2800 involves determining an arrangement of virtual objects within each sub-container based on semantics associated with their respective sub-containers and virtual objects. As discussed above, in some examples, the semantics pairing module 122 can determine semantics for filling the one or more sub-containers based on pairings of virtual objects to semantically-related sub-containers. And in other examples, the position analysis module 120 can determine optimized positioning, placement, arrangement, or ordering of virtual objects that can fit in the one or more sub-containers.

At block 2812, the process 2800 involves generating a second image depicting the virtual objects within the container according to any of the techniques discussed herein.

At block 2814, the process 2800 involves applying virtual lighting effects to the second image based on the arrangement of the virtual objects in the container according to any of the techniques discussed herein.

At block 2816, the process 2800 involves generating, for display, the second image depicting the storage container, the virtual lighting, and the arrangement of the virtual objects according to any of the techniques discussed herein.

Figure 29:
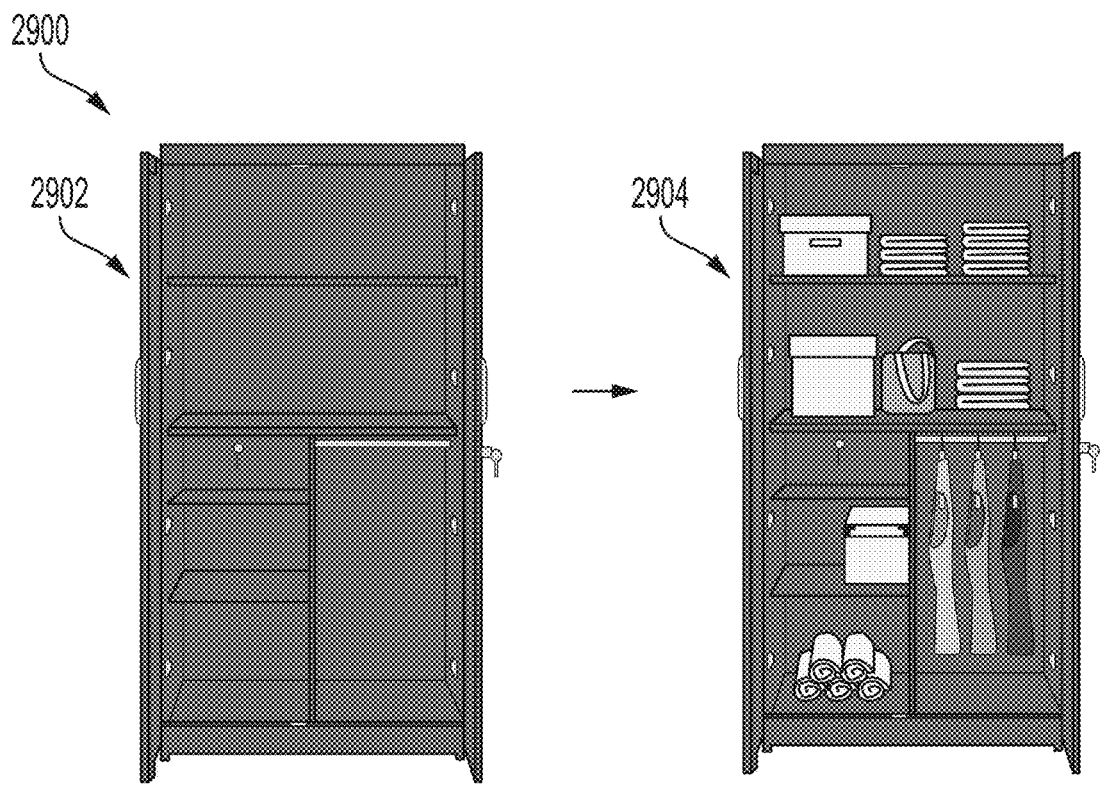
FIG. 29 depicts an example of visually augmenting images of three-dimensional containers with semantic arrangement of virtual objects and virtual lighting for three-dimensional objects for the process of FIG. 28, according to certain embodiments of the present disclosure.

FIG. 29 depicts an example of visually augmenting images of three-dimensional containers with semantic arrangement of virtual objects and virtual lighting for three-dimensional objects for the process of FIG. 28, according to certain embodiments of the present disclosure. More specifically, FIG. 29 depicts another example 2900 of first and second images similar to the first image received in blocks 202, 2402, and 2802 of processes 200, 2400, and 2800, respectively and the second image output in blocks 212, 2412, and 2816 of processes 200, 2400, and 2800, respectively.

In example 2900, shown in FIG. 29, a first image 2902 depicts a storage container of an armoire having identifiable sub-containers. In the example 2900, the first image 2902 depicting the open-doored armoire shows empty shelving with substantially little ambient lighting and virtually no discernable diffuse or specular lighting. However, the second image 2904 is generated with an assortment of virtual hung clothing, shelved towels, boxes, a duffel, which are selected and arranged to augment the open-doored armoire according to any of the techniques discussed herein. Further, the augmented second image 2904 is output, employing any of the virtual lighting effects described herein, adding ambient lighting effects to brighten the overall appearance of the container, using diffuse lighting to illustrate textural differences between surfaces (e.g., having greater reflectivity based on an added light source (not shown)), and adding specular lighting effects blended with the ambient and diffuse lighting to ensure smooth, non-linear transitions between lighting reflected by surfaces having varying amounts of luminescence based on the surface features of the virtual objects, their relative locations, sizes, and angular positioning.

Figure 30:
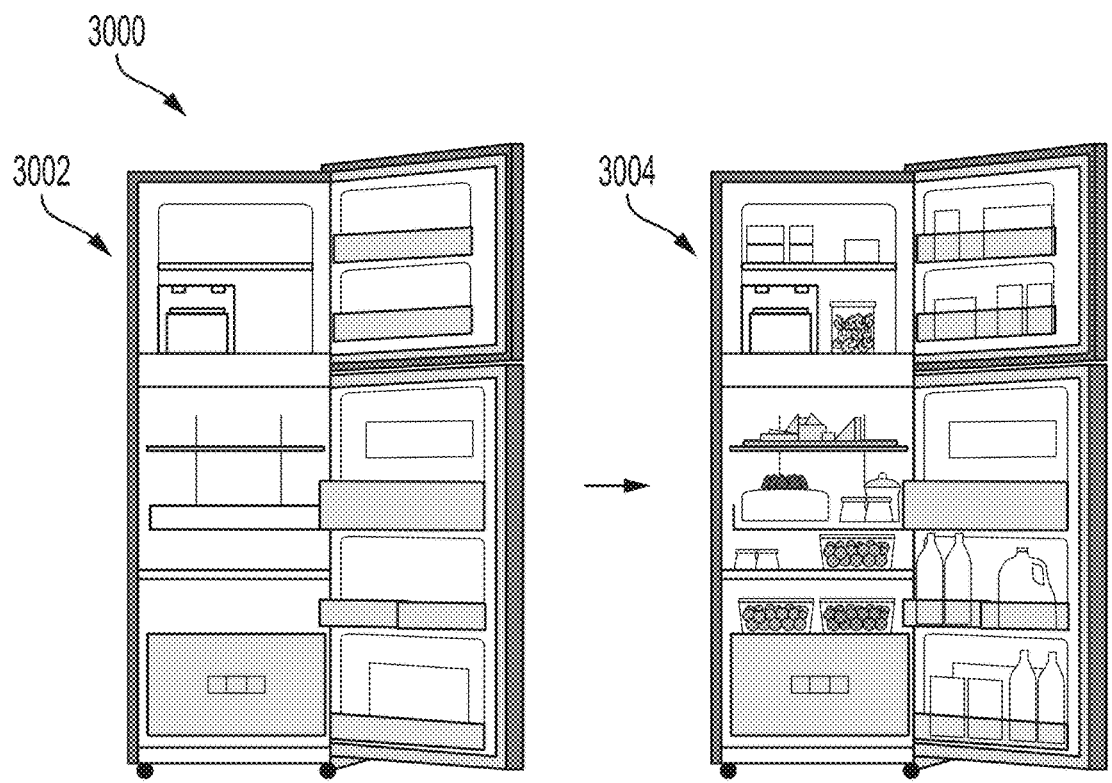
FIG. 30 depicts another example of visually augmenting images of three-dimensional containers with semantic arrangement of virtual objects and virtual lighting for three-dimensional objects for the process of FIG. 28, according to certain embodiments of the present disclosure.

Referring now to FIG. 30, FIG. 30 depicts another example of visually augmenting images of three-dimensional containers with semantic arrangement of virtual objects and virtual lighting for three-dimensional objects for the process of FIG. 28, according to certain embodiments of the present disclosure. Specifically, FIG. 30 depicts another example 3000 of first and second images similar to the first image received in blocks 202, 2402, and 2802 of processes 200, 2400, and 2800, respectively and the second image output in blocks 212, 2412, and 2816 of processes 200, 2400, and 2800, respectively.

In example 3000, shown in FIG. 30, a first image 3002 depicts a storage container of an armoire having identifiable sub-containers. In the example 3000, the first image 3002 depicts an open-doored refrigerator with empty shelving. However, the second image 3004 is generated with an assortment of virtual semantically-related food and beverage items, e.g., grapes, a cheese tray, oranges, brussel sprouts, water containers, juice containers, a milk container, which are selected and arranged to augment the open-doored refrigerator according to any of the techniques discussed herein. Further, the augmented second image 3004 can be output, employing any of the virtual lighting effects described herein.

In the example 3000, and starting from the respective top shelf of the refrigerator, the arrangement shown in the second image 3004 reflects an optimal arrangement of semantically-related items. For instance, the second image 3004 depicts two top shelves in a freezer sub-container of the refrigerator container. In this example 3000, frozen goods, e.g., ice in the ice maker, frozen meals, ice cream containers, and frozen shrimp are contained within the freezer. Similarly, frozen vegetables and additional frozen meals are also depicted on the respective door of the top two freezer shelves. In order to make the second image 3004 more appeal, the ice maker may be filled to the top, a similarly shaped rectangular cuboid of the frozen shrimp is placed on the same shelf adjacent to the similarly shaped ice maker. Further, similarly shaped frozen meals are stacked on top of each other, while similarly shaped ice cream containers are placed adjacent to each other on the uppermost freezer shelf.

Below, in the refrigeration portion of the refrigerator, the second image 3004 illustrates moderately spaced, un-cluttered items on four shelves within the main body of the refrigerator. However, below the lowermost shelf, a realistic combination of fruits and vegetables appear in a clear (e.g., translucent, semi-translucent, transparent, semi-transparent, quasi-opaque) fruit and vegetable bin sub-container. Further, the second image 3004 depicts the refrigeration portion of the refrigerator with neatly filled and arranged containers, foods, and eggs. However, in some examples, the eggs displayed in the egg baskets of the refrigeration portion can be purposefully asymmetrical, an imperfect matching number of eggs (e.g., outputting nine, ten, eleven, or any other non-matching number of eggs for a twelve-egg tray), or can be generated according to any other technique discussed herein.

Example of a Computing System for Providing a Consumer Reaction Model

Figure 31:
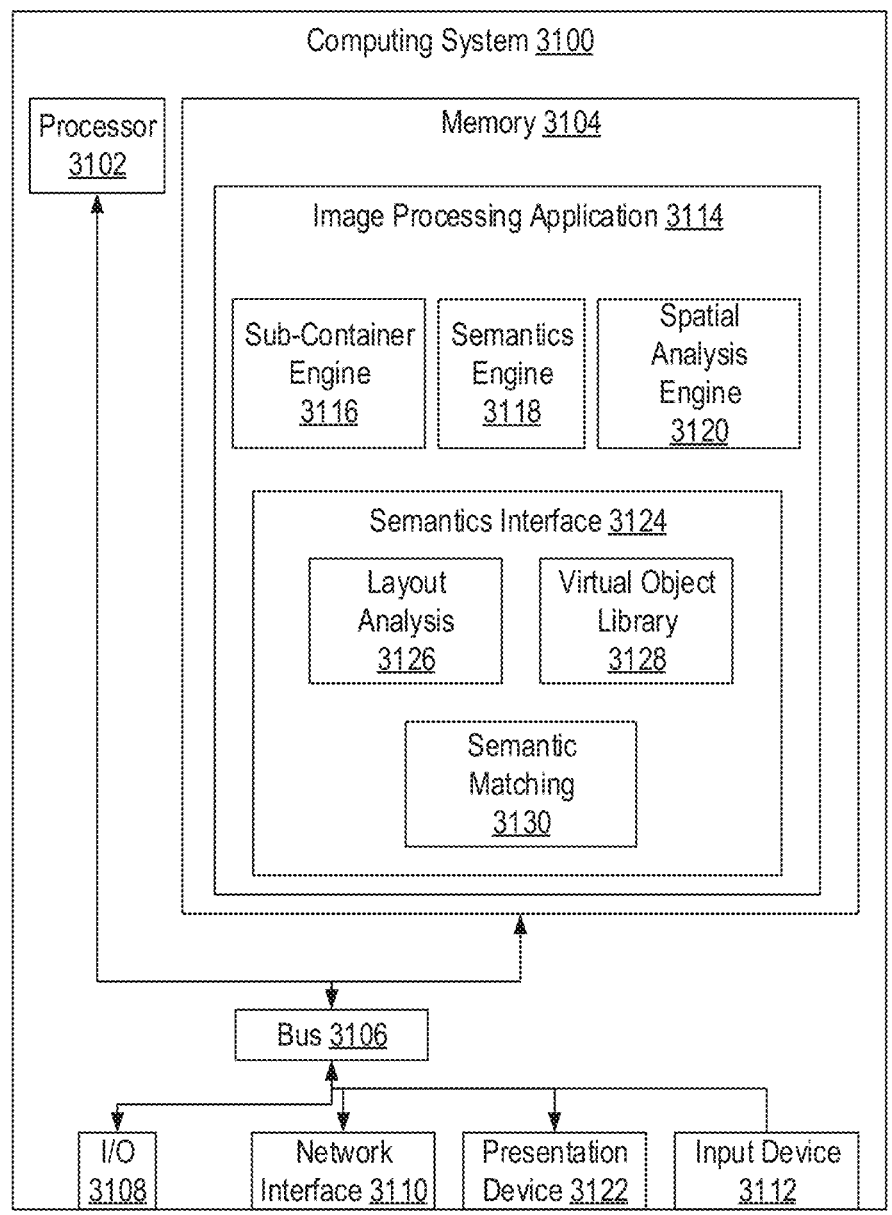
FIG. 31 depicts an example of a computing system that performs certain operations described herein, according to certain embodiments of the present disclosure.

Any suitable computing system or group of computing systems can be used for performing the operations described herein. For example, FIG. 31 depicts examples of computing system 3100 that executes an image processing application 3114. In some embodiments, the computing system 3100 also executes the semantics interface 3124, as depicted in FIG. 31. In other embodiments, a separate computing system having devices similar to those depicted in FIG. 31 (e.g., a processor, a memory, etc.) executes the semantics interface 3124.

The depicted examples of a computing system 3100 includes a processor 3102 communicatively coupled to one or more memory devices 3104. The processor 3102 executes computer-executable program code stored in a memory device 3104, accesses information stored in the memory device 3104, or both. Examples of the processor 3102 include a microprocessor, an application-specific integrated circuit ("ASIC"), a field-programmable gate array ("FPGA"), or any other suitable processing device. The processor 3102 can include any number of processing devices, including a single processing device.

The memory device 3104 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, OpenCV, C, C++, C #, Visual Basic, Java, Python, Perl, JavaScript, and ActionScript.

The computing system 3100 may also include a number of external or internal devices, such as an input device 3112, a presentation device 3122, or other input or output devices. For example, the computing system 3100 is shown with one or more input/output ("I/O") interfaces 3108. An I/O interface 3108 can receive input from input devices or provide output to output devices. One or more buses 3106 are also included in the computing system 3100. The bus 3106 communicatively couples one or more components of a respective one of the computing system 3100.

The computing system 3100 executes program code that configures the processor 3102 to perform one or more of the operations described herein. The program code includes, for example, the image processing application 3114, the semantics interface 3124, or other suitable applications that perform one or more operations described herein. The program code may be resident in the memory device 3104 or any suitable computer-readable medium and may be executed by the processor 3102 or any other suitable processor. In some embodiments, all modules in the image processing application 3114 (e.g., the sub-container engine 3116, semantics engine 3118, spatial analysis engine 3120, layout analysis engine, semantic matching engine, etc.) are stored in the memory device 3104, as depicted in FIG. 31. In additional or alternative embodiments, one or more of the image processing application 3114 and the semantics interface 3124 are stored in different memory devices of different computing systems. In additional or alternative embodiments, the program code described above is stored in one or more other memory devices accessible via a data network.

The computing system 3100 can access one or more of the image processing application 3114 and the semantics interface 3124 in any suitable manner. In some embodiments, some or all of one or more of these data sets, models, and functions are stored in the memory device 3104, as in the example depicted in FIG. 31. For example, a computing system 3100 that executes the image processing application 3114 can provide access to the semantics matching section 3130 by external systems that execute the semantics interface 3124.

In additional or alternative embodiments, one or more of these data sets, models, and functions are stored in the same memory device (e.g., one of the memory device 3104). For example, a common computing system, such as image database 102 depicted in FIG. 1, can host the image processing system 104 and the semantics tool 112, as well as the virtual object database 116. In additional or alternative embodiments, one or more of the programs, data sets, models, and functions described herein are stored in one or more other memory devices accessible via a data network.

The computing system 3100 also includes a network interface device 3110. The network interface device 3110 includes any device or group of devices suitable for establishing a wired or wireless data connection to one or more data networks. Non-limiting examples of the network interface device 3110 include an Ethernet network adapter, a modem, and the like. The computing system 3100 is able to communicate with one or more other computing devices (e.g., a computing device executing a semantics tool 112) via a data network with the network interface device 3110.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices performs operations comprising:
   receiving a first image that depicts a storage container;
   identifying, based on an analysis of one or more shapes detected within the first image, a sub-container within the storage container;
   performing a semantics pairing process to:
   select, from a virtual object library, a plurality of virtual objects that are semantically related to a type of the sub-container;
   determine an arrangement of the plurality of virtual objects within the sub-container, wherein the arrangement comprises the plurality of virtual objects arranged according to semantic categories;
   generating a second image that depicts the arrangement of the plurality of virtual objects within the sub-container; and
   generating, for display, the second image depicting the storage container and the arrangement of the plurality of virtual objects within the sub-container.

2. The method of claim 1, wherein candidate virtual objects within the virtual object library are three-dimensional and are grouped according to semantic categories, and wherein determining the arrangement comprises:
   computing a three-dimensional box corresponding to the sub-container; and
   determining an arrangement of the plurality of virtual objects based in part on a semantic category associated with each of the plurality of virtual objects.

3. The method of claim 2, wherein determining the arrangement of the plurality of virtual objects within the sub-container comprises:
   determining a texture associated with each object of the plurality of virtual objects; and
   determining the arrangement of the plurality of virtual objects within the sub-container based in part on groups of virtual objects having similar textures.

4. The method of claim 1, the operations further comprising:
   generating virtual lighting based on the arrangement of the plurality of virtual objects; and
   modifying the second image to include the generated virtual lighting, wherein the second image includes the generated virtual lighting.

5. The method of claim 4, wherein generating the virtual lighting based on the arrangement of the plurality of virtual objects comprises:
   identifying a source of light associated with the first image;
   calculating a virtual diffuse lighting based on a location of the source of light relative to a surface of each virtual object from the plurality of virtual objects;
   generating the virtual lighting based at least in part on the calculated virtual diffuse lighting.

6. The method of claim 4, wherein generating the virtual lighting based on the arrangement of the plurality of virtual objects comprises:
   determining virtual ambient lighting associated with each virtual object from the plurality of virtual objects; and
   generating the virtual lighting based at least in part on the determined virtual ambient lighting.

7. The method of claim 4, wherein generating the virtual lighting based on the arrangement of the plurality of virtual objects comprises:
    identifying a source of light associated with the first image;
    calculating a virtual specular lighting based on a mirrored location of the source of light relative to a surface of each virtual object from the plurality of virtual objects; and
    generating the virtual lighting based at least in part on the calculated virtual specular lighting.

8. The method of claim 4, wherein generating the virtual lighting based on the arrangement of the plurality of virtual objects comprises:
    for each of the plurality of virtual objects:
        determining surface information for the virtual object comprising at least one of a texture, a reflectivity, a color, a shape, a relative position, a relative elevation, a flatness, a proximity to other virtual objects of the plurality of virtual objects, or a contrast;
        determining an amount of ambient lighting, diffuse lighting, or specular lighting for the virtual object;
        in response to the determining that the determined amount is less than a threshold amount, increasing the amount of ambient lighting, diffuse lighting, or specular lighting for the virtual object so that it equals the threshold amount.

9. A system, comprising:
one or more processing devices; and
a non-transitory computer-readable medium communicatively coupled to the one or more processing devices and storing instructions,
wherein the one or more processing devices are configured to execute the instructions and thereby perform operations comprising:
    receiving a first image that depicts a storage container;
    identifying, based on an analysis of one or more shapes detected within the first image, a sub-container within the storage container;
    performing a semantics pairing process to:
        select, from a virtual object library, a plurality of virtual objects that are semantically related to a type of the sub-container; and
        determine an arrangement of the plurality of virtual objects within the sub-container, wherein the arrangement comprises the plurality of virtual objects arranged according to semantic categories;
    generating a second image that depicts the arrangement of the plurality of virtual objects within the sub-container; and
    generating, for display, the second image depicting the storage container and the arrangement of the plurality of virtual objects within the sub-container.

10. The system of claim 9, wherein the one or more processing devices are further configured to execute the instructions and thereby perform operations comprising:
    generating virtual lighting based on the arrangement of the plurality of virtual objects; and
    modifying the second image to include the generated virtual lighting, wherein the second image includes the generated virtual lighting.

11. The system of claim 10, wherein generating the virtual lighting based on the arrangement of the plurality of virtual objects comprises:
    identifying a source of light associated with the first image;
    calculating a virtual diffuse lighting based on a location of the source of light relative to a surface of each virtual object from the plurality of virtual objects;
    generating the virtual lighting based at least in part on the calculated virtual diffuse lighting.

12. The system of claim 10, wherein generating the virtual lighting based on the arrangement of the plurality of virtual objects comprises:
    determining virtual ambient lighting associated with each virtual object from the plurality of virtual objects; and
    generating the virtual lighting based at least in part on the determined virtual ambient lighting.

13. The system of claim 10, wherein generating the virtual lighting based on the arrangement of the plurality of virtual objects comprises:
    identifying a source of light associated with the first image;
    calculating a virtual specular lighting based on a mirrored location of the source of light relative to a surface of each virtual object from the plurality of virtual objects; and
    generating the virtual lighting based at least in part on the calculated virtual specular lighting.

14. The system of claim 10, wherein generating the virtual lighting based on the arrangement of the plurality of virtual objects comprises:
    for each of the plurality of virtual objects:
        determining surface information for the virtual object comprising at least one of a texture, a reflectivity, a color, a shape, a relative position, a relative elevation, a flatness, a proximity to other virtual objects of the plurality of virtual objects, or a contrast;
        determining an amount of ambient lighting, diffuse lighting, or specular lighting for the virtual object;
        in response to the determining that the determined amount is less than a threshold amount, increasing the amount of ambient lighting, diffuse lighting, or specular lighting for the virtual object so that it equals the threshold amount.

15. A non-transitory computer-readable medium storing instructions executable by one or more processing devices, wherein the instructions, when executed by the one or more processing devices, cause the one or more processing devices to perform operations comprising:
    receiving a first image that depicts a storage container;
    identifying, based on an analysis of one or more shapes detected within the first image, a sub-container within the storage container;
    performing a semantics pairing process to:
        select, from a virtual object library, a plurality of virtual objects that are semantically related to a type of the sub-container;
        determine an arrangement of the plurality of virtual objects within the sub-container, wherein the arrangement comprises the plurality of virtual objects arranged according to semantic categories;
    generating a second image that depicts the arrangement of the plurality of virtual objects within the sub-container; and
    generating, for display, the second image depicting the storage container and the arrangement of the plurality of virtual objects within the sub-container.

16. The non-transitory computer-readable medium of claim 15, wherein the instructions, when executed by the one or more processing devices, cause the one or more processing devices to further perform operations comprising:

generating virtual lighting based on the arrangement of the plurality of virtual objects; and modifying the second image to include the generated virtual lighting, wherein the second image includes the generated virtual lighting.

17. The non-transitory computer-readable medium of claim 16, wherein generating the virtual lighting based on the arrangement of the plurality of virtual objects comprises:

identifying a source of light associated with the first image;

calculating a virtual diffuse lighting based on a location of the source of light relative to a surface of each virtual object from the plurality of virtual objects;

generating the virtual lighting based at least in part on the calculated virtual diffuse lighting.

18. The non-transitory computer-readable medium of claim 16, wherein generating the virtual lighting based on the arrangement of the plurality of virtual objects comprises:

determining virtual ambient lighting associated with each virtual object from the plurality of virtual objects; and generating the virtual lighting based at least in part on the determined virtual ambient lighting.

19. The non-transitory computer-readable medium of claim 16, wherein generating the virtual lighting based on the arrangement of the plurality of virtual objects comprises:

identifying a source of light associated with the first image;

calculating a virtual specular lighting based on a mirrored location of the source of light relative to a surface of each virtual object from the plurality of virtual objects; and generating the virtual lighting based at least in part on the calculated virtual specular lighting.

20. The non-transitory computer-readable medium of claim 16, wherein generating the virtual lighting based on the arrangement of the plurality of virtual objects comprises:

for each of the plurality of virtual objects:

determining surface information for the virtual object comprising at least one of a texture, a reflectivity, a color, a shape, a relative position, a relative elevation, a flatness, a proximity to other virtual objects of the plurality of virtual objects, or a contrast;

determining an amount of ambient lighting, diffuse lighting, or specular lighting for the virtual object;

in response to the determining that the determined amount is less than a threshold amount, increasing the amount of ambient lighting, diffuse lighting, or specular lighting for the virtual object so that it equals the threshold amount.

\* \* \* \* \*